(12) United States Patent
Larsen et al.

(10) Patent No.: US 6,898,437 B1
(45) Date of Patent: May 24, 2005

(54) POWER ADAPTION IN A MULTI-STATION NETWORK

(75) Inventors: Mark Sievert Larsen, Val-De-Grace (ZA); James David Larsen, Pretoria (ZA)

(73) Assignee: Iwics Inc., Bothell, WA (US)

( * ) Notice: Subject to any disclaimer, the term of this patent is extended or adjusted under 35 U.S.C. 154(b) by 0 days.

(21) Appl. No.: 09/463,541

(22) PCT Filed: Aug. 3, 1998

(86) PCT No.: PCT/GB98/02329
§ 371 (c)(1),
(2), (4) Date: Mar. 9, 2000

(87) PCT Pub. No.: WO99/07105
PCT Pub. Date: Feb. 11, 1999

(30) Foreign Application Priority Data

Aug. 1, 1997 (ZA) .............................................. 97/6885

(51) Int. Cl.⁷ ................................................. H04B 1/40
(52) U.S. Cl. ........................... 455/522; 455/69; 455/70; 455/67.1; 455/127.2; 455/226.1; 455/456.5
(58) Field of Search ........................... 455/522, 68, 69, 455/70, 67.11, 127.11, 127.2, 127.3, 226.1, 226.2, 226.3, 226.4, 456.5

(56) References Cited

U.S. PATENT DOCUMENTS

| 5,425,051 A | | 6/1995 | Mahany ...................... 375/202 |
| 5,564,075 A | | 10/1996 | Gourgue ...................... 455/69 |
| 5,835,857 A | * | 11/1998 | Otten .................... 455/456.5 X |
| 5,943,606 A | * | 8/1999 | Kremm et al. ......... 455/67.11 X |

FOREIGN PATENT DOCUMENTS

| EP | 0602340 | 6/1994 | ............ H04Q/7/04 |
| EP | 0767548 | 4/1997 | ............ H04B/7/26 |
| EP | 0773636 | 5/1997 | ............ H04B/7/005 |
| WO | 9512295 | 5/1995 | ............ H04Q/7/38 |
| WO | 9619887 | 6/1996 | ............ H04L/12/56 |
| WO | 9631009 | 10/1996 | ............ H04B/1/034 |

OTHER PUBLICATIONS

Michel Mouly, Marie–Bernadette Pautet: "GSM—The System for Mobile Communications" 1993. Cell & SYS. Correspondence. Mercer Island, WA, U.S.A. XP002101339 235920.

* cited by examiner

Primary Examiner—Nay Maung
Assistant Examiner—Philip J. Sobutka
(74) Attorney, Agent, or Firm—Ladas & Parry LLP

(57) ABSTRACT

The invention relates to a method of operating a communication network, the network comprising a plurality of stations which are able to transmit data to and receive data from one another. The method comprises monitoring, at each station, the transmission path quality between that station and each other station with which that station can communicate. Data corresponding to the monitored path quality is recorded at each station, thereby permitting a transmission power value based on the relevant path quality data to be selected when transmitting data to another station. Thus, the probability of transmitting data to any selected station at an optimum power level is increased. Each station transmits path quality data in its own transmissions as well as local noise/interference data, so that other stations can obtain path quality data for a particular station even if they are out of range of that particular station. The invention extends to communication apparatus which can be used to implement the method.

21 Claims, 18 Drawing Sheets

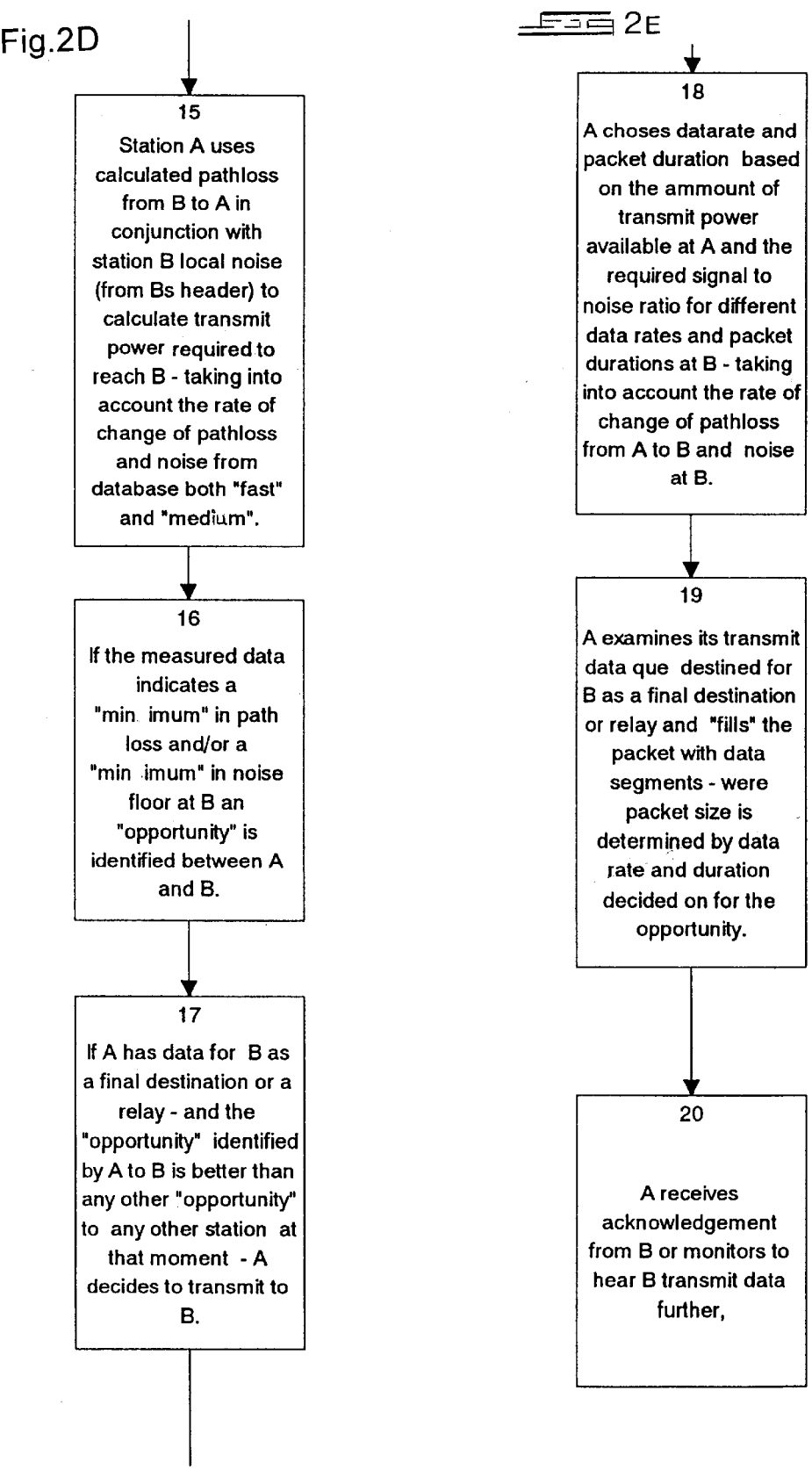

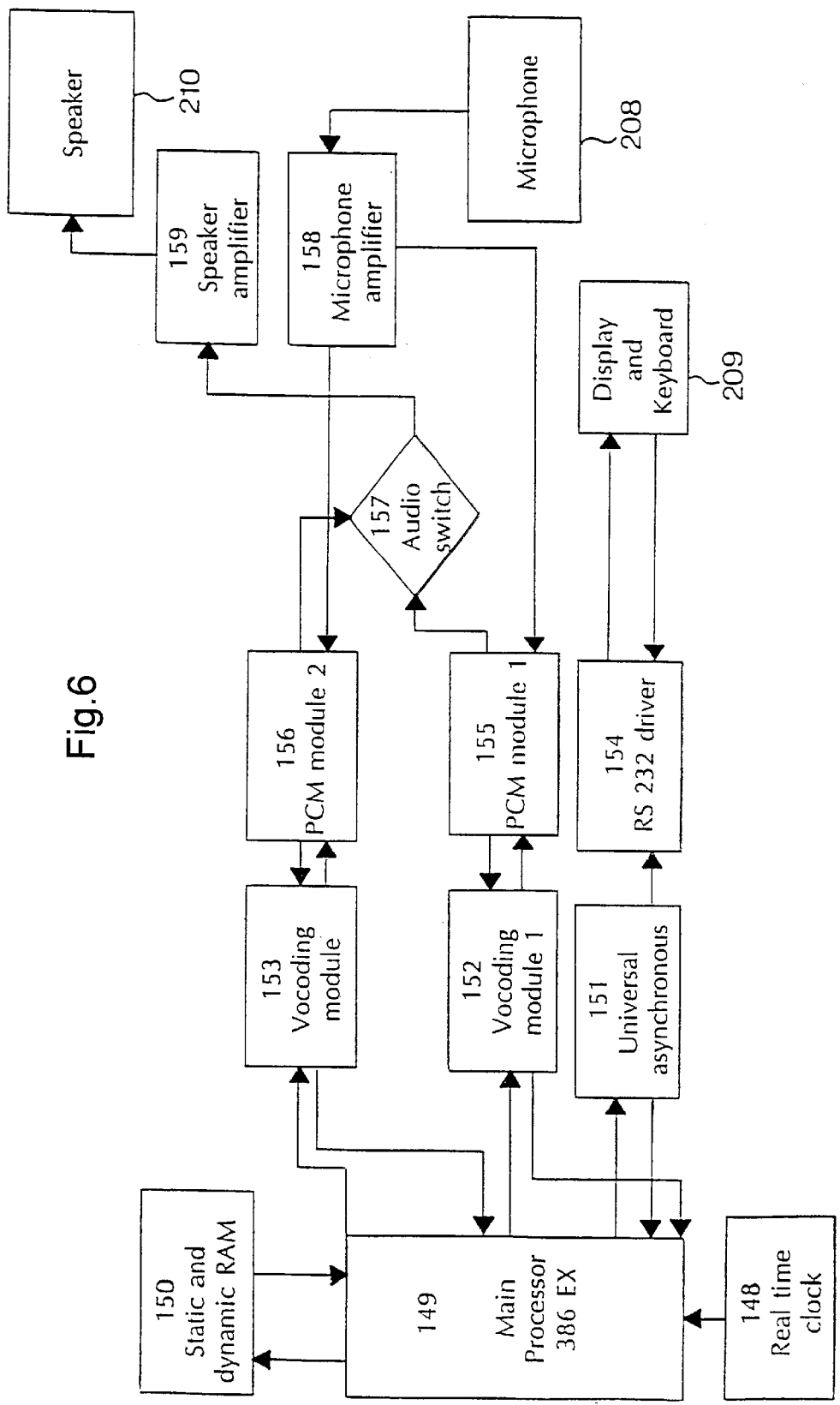

POWER ADAPTION IN A MULTI-STATION NETWORK

BACKGROUND OF THE INVENTION

This invention relates to a method of operating a multi-station communication network and to communication apparatus usable to implement the method.

International patent application no. WO 96/19887 describes a communication network in which individual stations in the network can send messages to other stations by using intermediate stations to relay the message data in an opportunistic manner. In networks of this kind, and in other multi-station networks, it is desirable to control the output power of transmitting stations to a level which is sufficient for successful reception of transmitted data, but which is otherwise as low as possible, to minimise interference with nearby stations or with other users of the radio frequency spectrum.

It is an object of the invention to provide a method of operating a multi-station communication network which addresses the above objective.

SUMMARY OF THE INVENTION

According to the invention there is provided a method of operating a communication network comprising a plurality of stations able to transmit data to and receive data from one another, the method comprising:

monitoring, at each station, the path quality between that station and each other station with which that station communicates;

recording, at each station, path quality data corresponding to the path quality associated with each said other station; and setting, at each station, a transmission power value based on the recorded path quality data associated with a selected other station when transmitting data to said selected other station, thereby to increase the probability of transmitting data to said selected other station at an optimum power level.

The monitoring of path quality between stations may include monitoring at least one of the path loss, phase distortion, time delay, Doppler shift and multipath fading characteristics of a channel between the stations.

The method preferably includes transmitting path quality data corresponding to the path quality between a first and a second station when transmitting other data between the stations, so that path quality data recorded at the first station is communicated to the second station for use by the second station and vice versa.

The path quality at a station receiving a data transmission may be calculated by comparing the measured power of the received transmission with data in the transmission indicating the transmission power thereof.

A station receiving such path quality data preferably will compare the received path quality data with respective stored path quality data and calculate a path quality correction value from a difference between the received and stored values, the path quality correction value being utilised to adjust the transmission power when transmitting data to the station which transmitted the path quality data.

The path quality correction factor may be calculated by deriving rate of change data from a plurality of path quality correction factor calculations.

The rate of change data may be utilised to adjust the transmission power predictively when transmitting data to a station whose path quality correction value is detected to be changing over time.

The method may include monitoring, from a station transmitting data, the background noise/interference at a station receiving a data transmission and adjusting the transmission power value at the station transmitting data to the receiving station, thereby to maintain the required signal to noise ratio at the receiving station.

The method may include adjusting the data rate of message data transmitted from a first station to a second station according to the transmission power value set at the first station and the required signal to noise ratio at the second station.

The method may also include adjusting the length of message data packets transmitted from a first station to a second station according to the transmission power value set at the first station and the required signal to noise ratio at the second station.

Each station preferably monitors the transmissions of other stations to obtain path quality and background noise/interference data therefrom, so that a first station monitoring a transmission from a second station within range of the first station to a third station out of range of the first station can obtain path quality and background noise/interference data relating to the third station.

The method preferably includes selecting, opportunistically, a station for transmission of data thereto according to the path quality and/or background noise/interference data associated therewith.

Further according to the invention there is provided communication apparatus operable as a station in a network comprising a plurality of stations which can transmit data to and receive data from one another, the communication apparatus comprising:

transmitter means arranged to transmit data to selected stations;

receiver means arranged to receive data transmitted from other stations;

signal strength measuring means for measuring the power of received transmissions;

processor means for recording path quality data corresponding to the path quality associated with other stations; and control means for adjusting the output power of the transmitter according to the path quality between the apparatus and a destination station.

The processor means is preferably arranged to calculate the path quality by comparing data in received transmissions relating to their transmission power and/or a previously measured path quality with the measurements made by the signal strength measuring means.

The processor means is preferably arranged to monitor at least one of the path loss, phase distortion, time delay, Doppler shift and multipath fading characteristics of a channel between the apparatus and other stations.

The processor means is preferably arranged to extract path quality data from received transmissions, to compare the path quality data with the measured power of received transmissions, and to calculate a path quality correction factor from the difference therebetween, the path quality correction factor being utilised by the control means to adjust the output power of the transmitter.

The processor means may be adapted to derive rate of change data from a plurality of path quality correction factor calculations, thereby to compensate for variations in the path quality between stations.

The processor means is preferably arranged to utilise the rate of change data to adjust the transmission power predictively when transmitting data to a station whose path quality correction value is detected to be changing over time.

Preferably, the processor means is arranged to store path quality data for each of a plurality of stations and to set an initial transmission power value when initiating communication with any of said plurality of stations according to the respective stored path quality data.

The processor means is preferably adapted to monitor transmissions of other stations to obtain path quality and background noise/interference data therefrom, so that the apparatus can select, opportunistically, another station for transmission of data thereto according to the path quality and/or background noise/interference data associated therewith.

BRIEF DESCRIPTION OF THE DRAWINGS

FIGS. 2A to 2E comprise together a simplified flow diagram indicating graphically the operation of the method of the invention;

FIGS. 3 to 6 are schematic block diagrams of apparatus suitable for implementing the invention.

DESCRIPTION OF EMBODIMENTS

Figure 1:
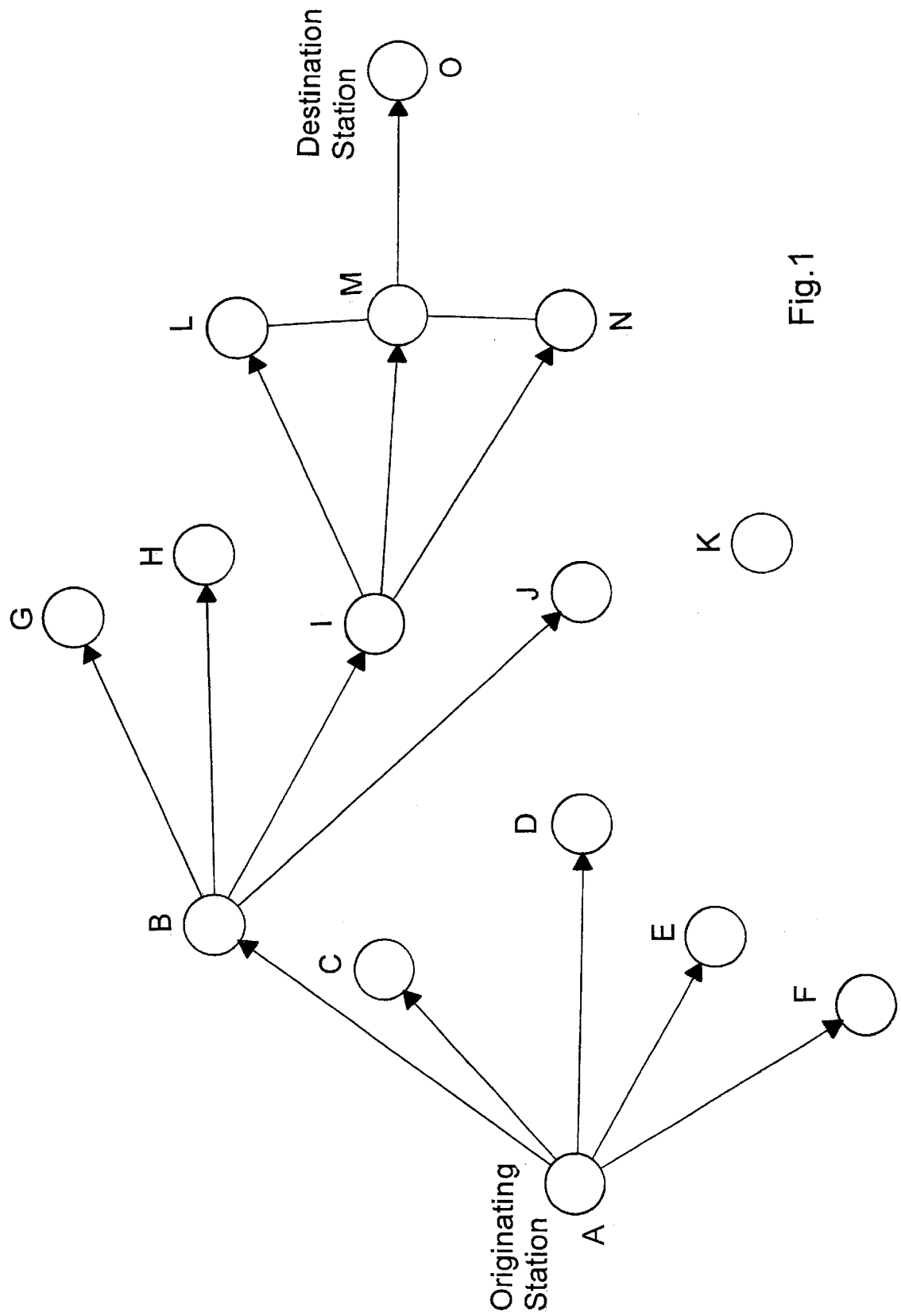
FIG. 1 is a schematic diagram of a multi-station communication network, indicating how an originating station can transmit data via a plurality of intermediate stations to a destination station.
Figure 2A:
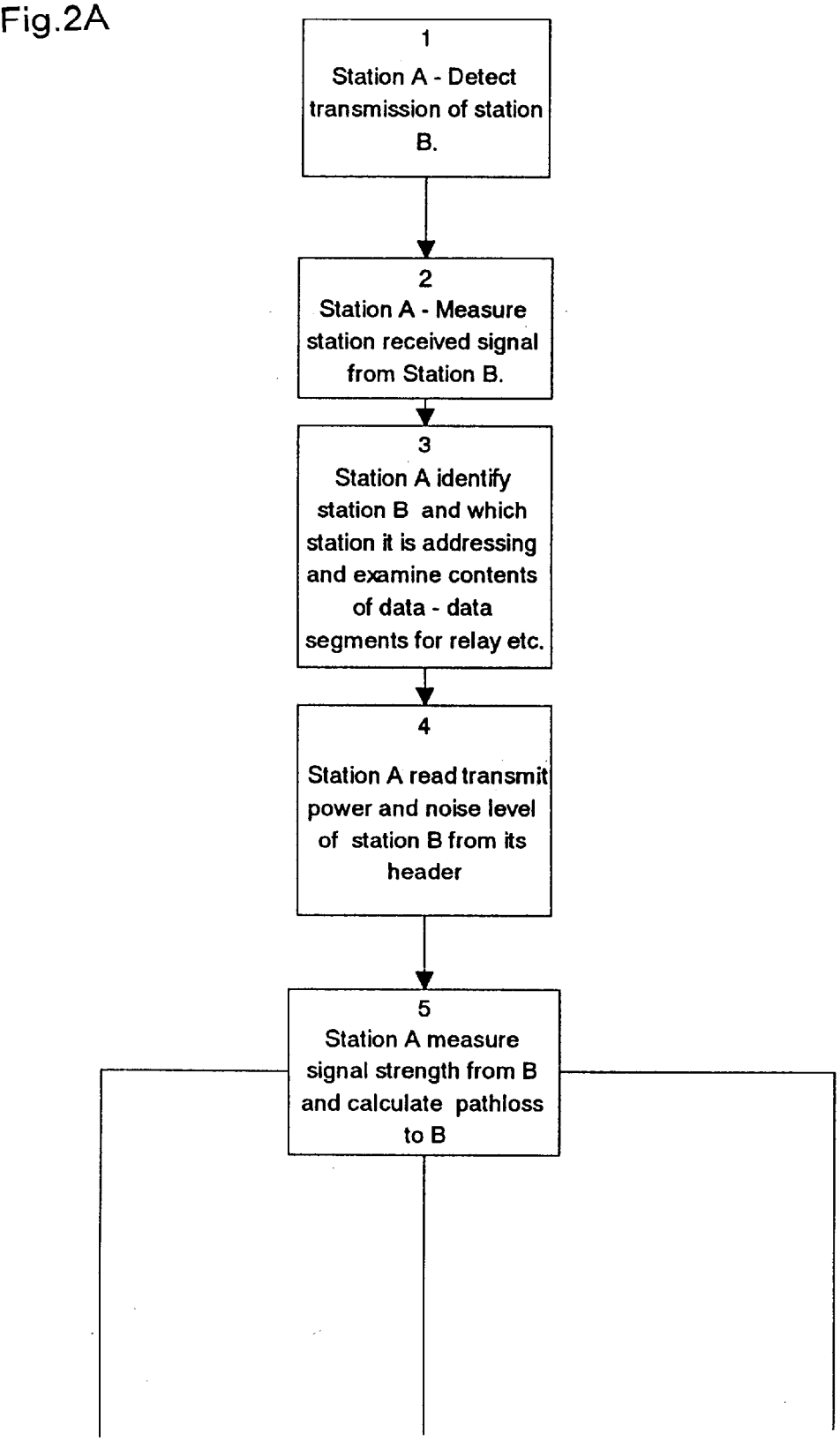
Figure 2B:
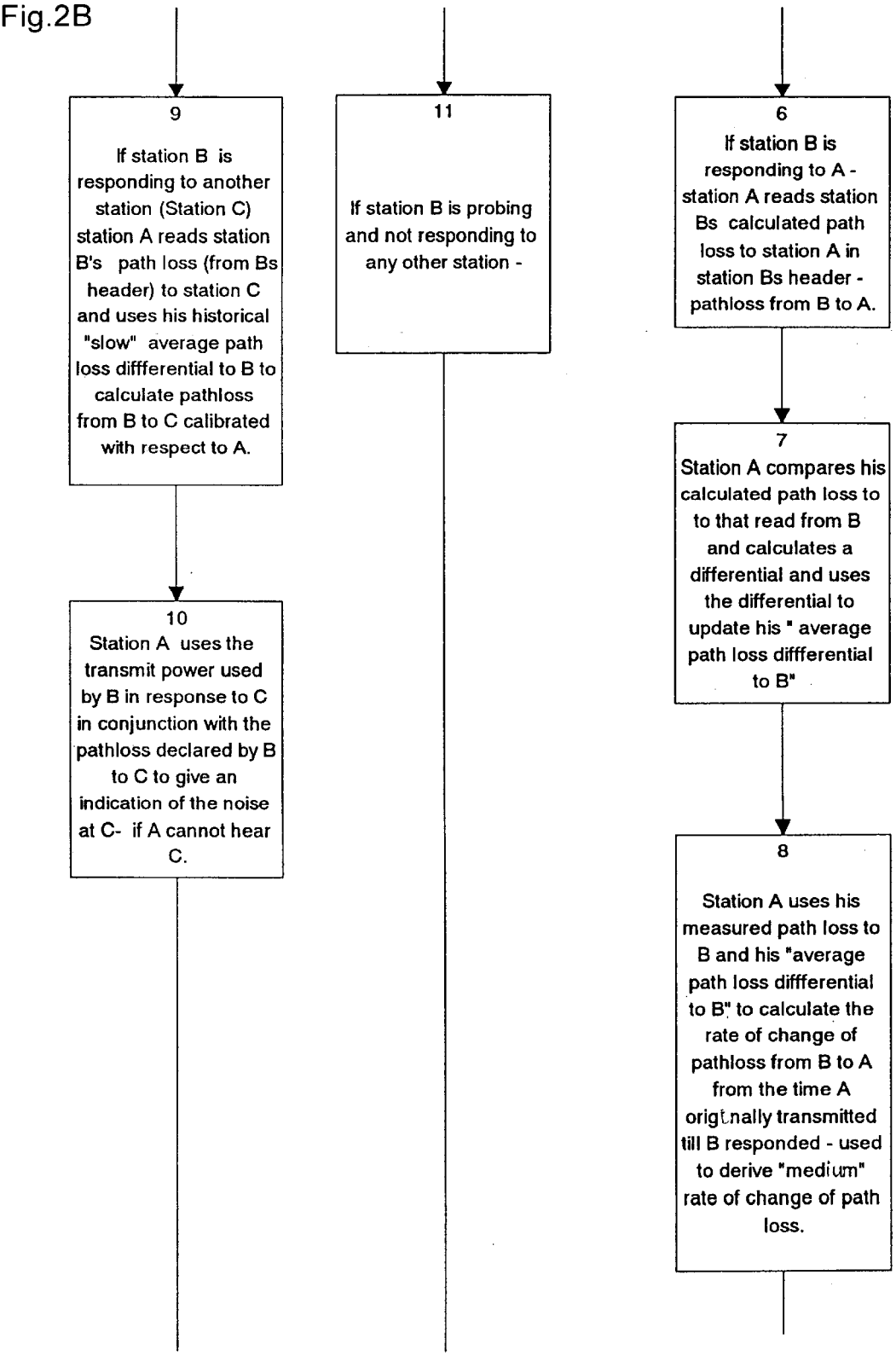
Figure 2C:
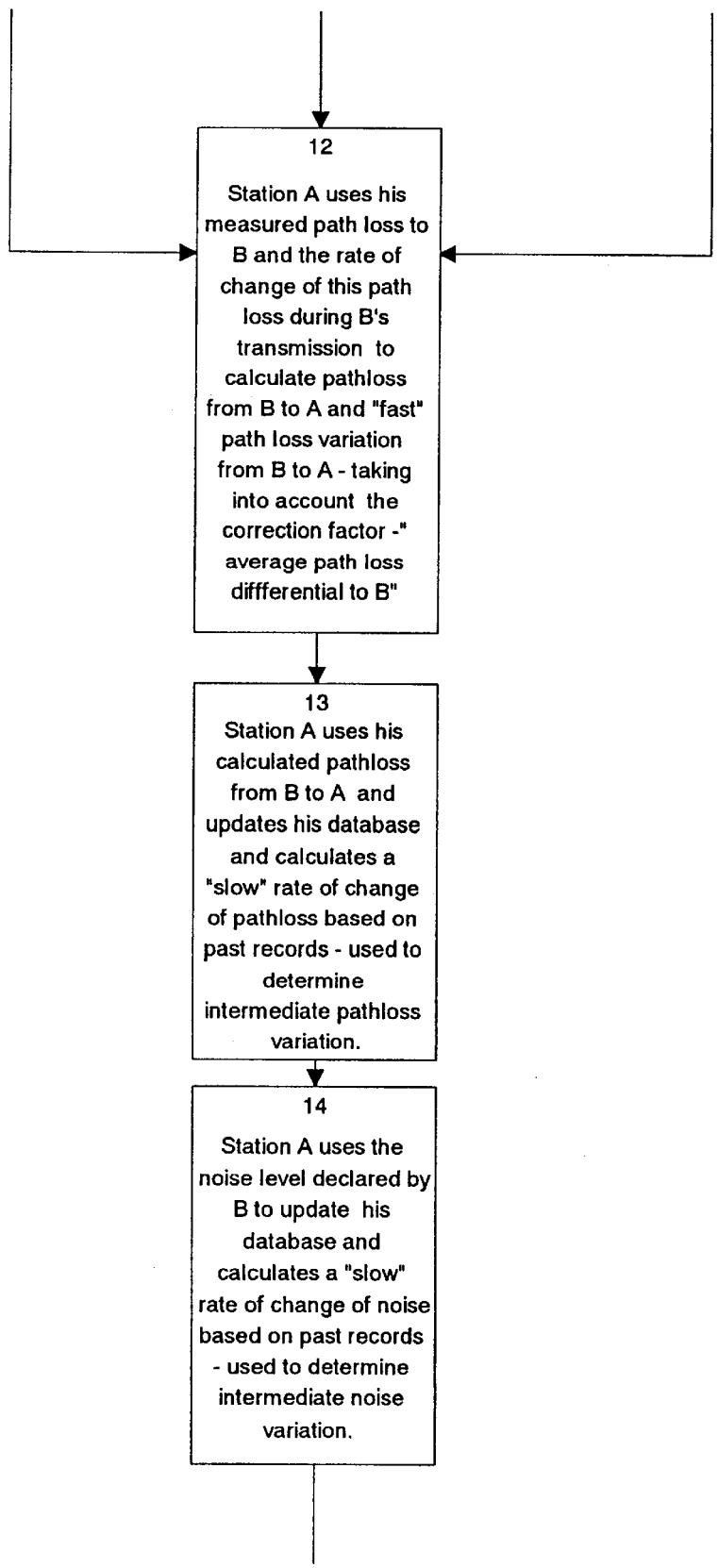
Figure 3A:
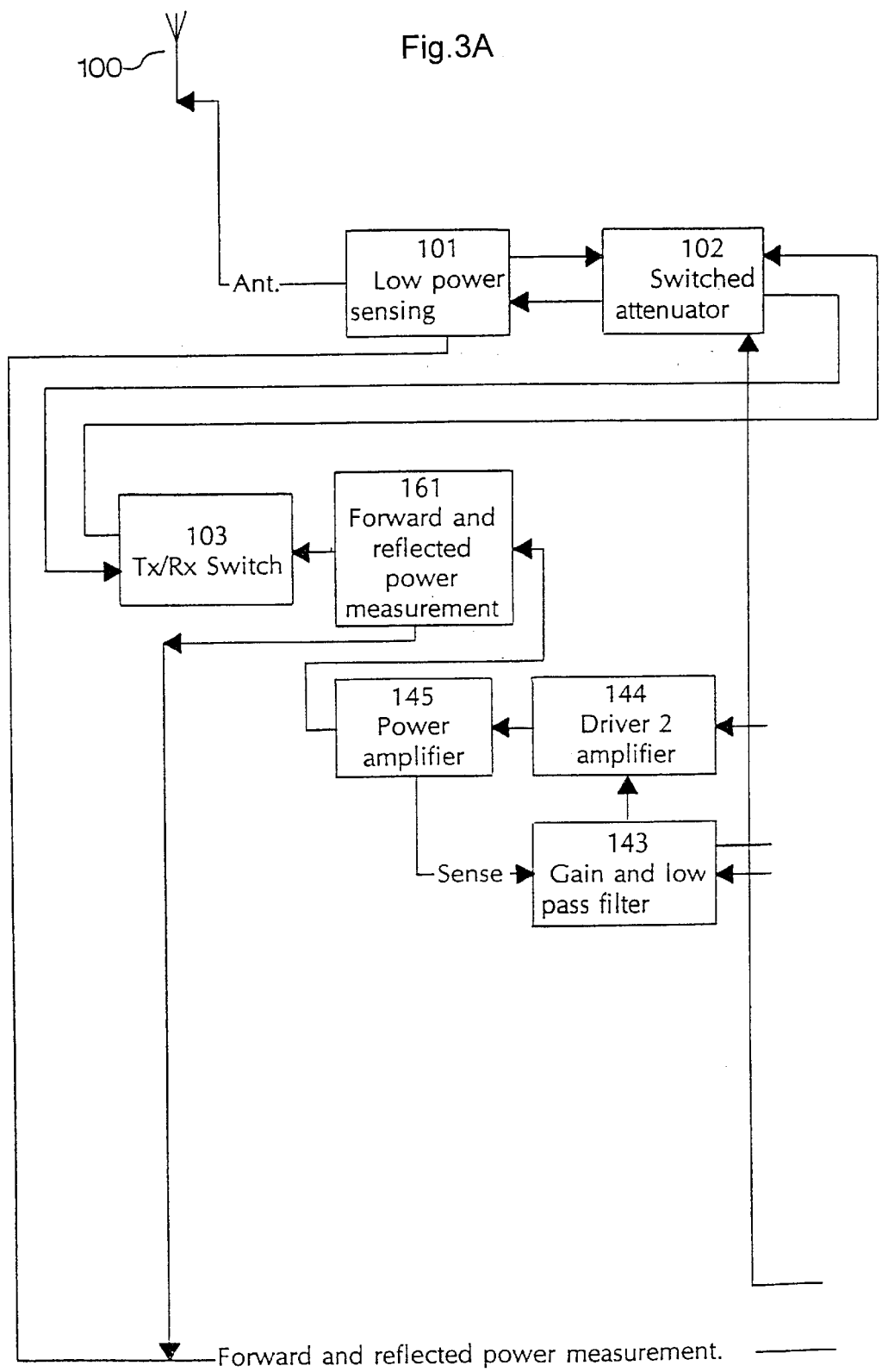
Figure 3B:
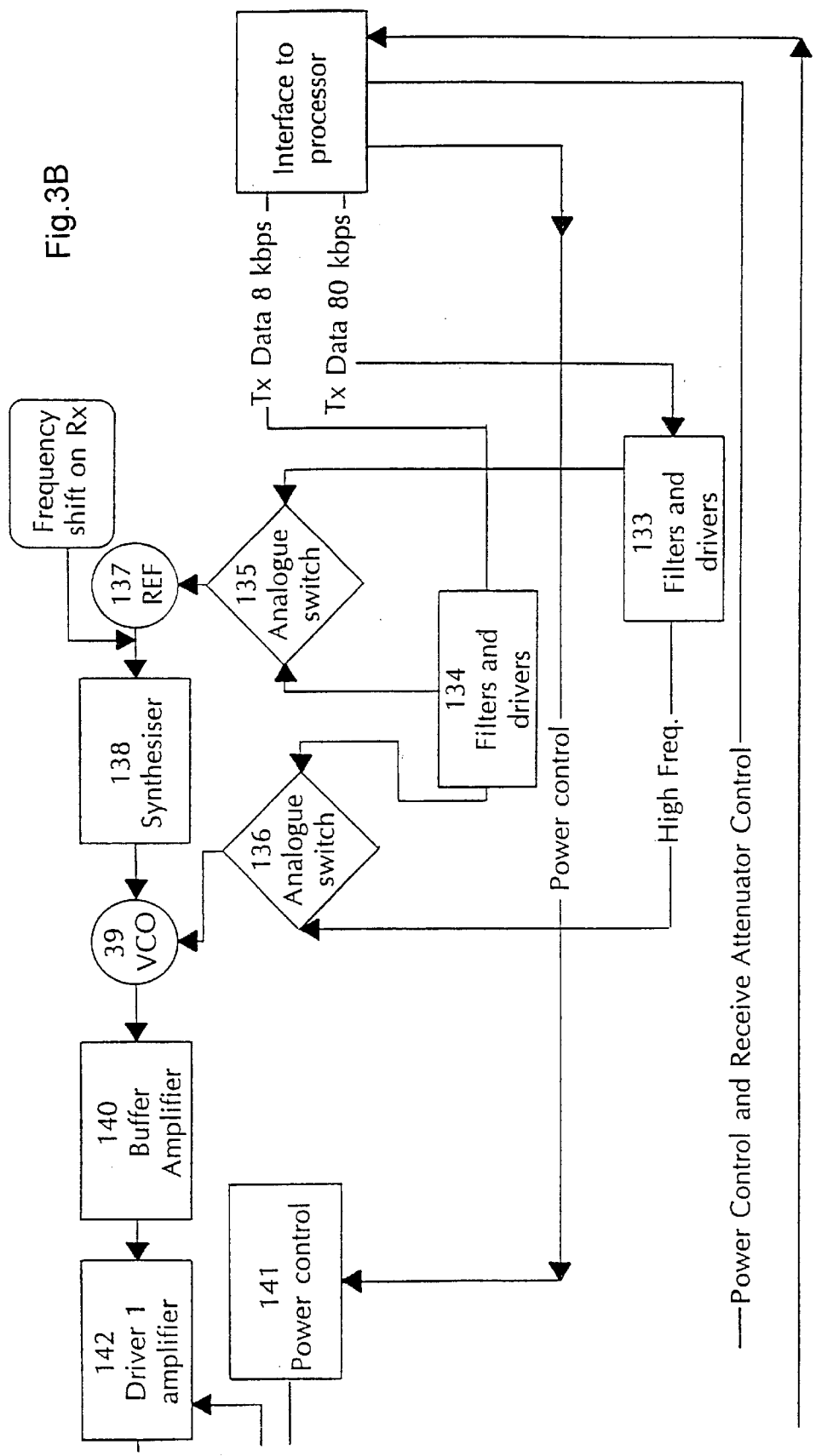
Figure 4A:
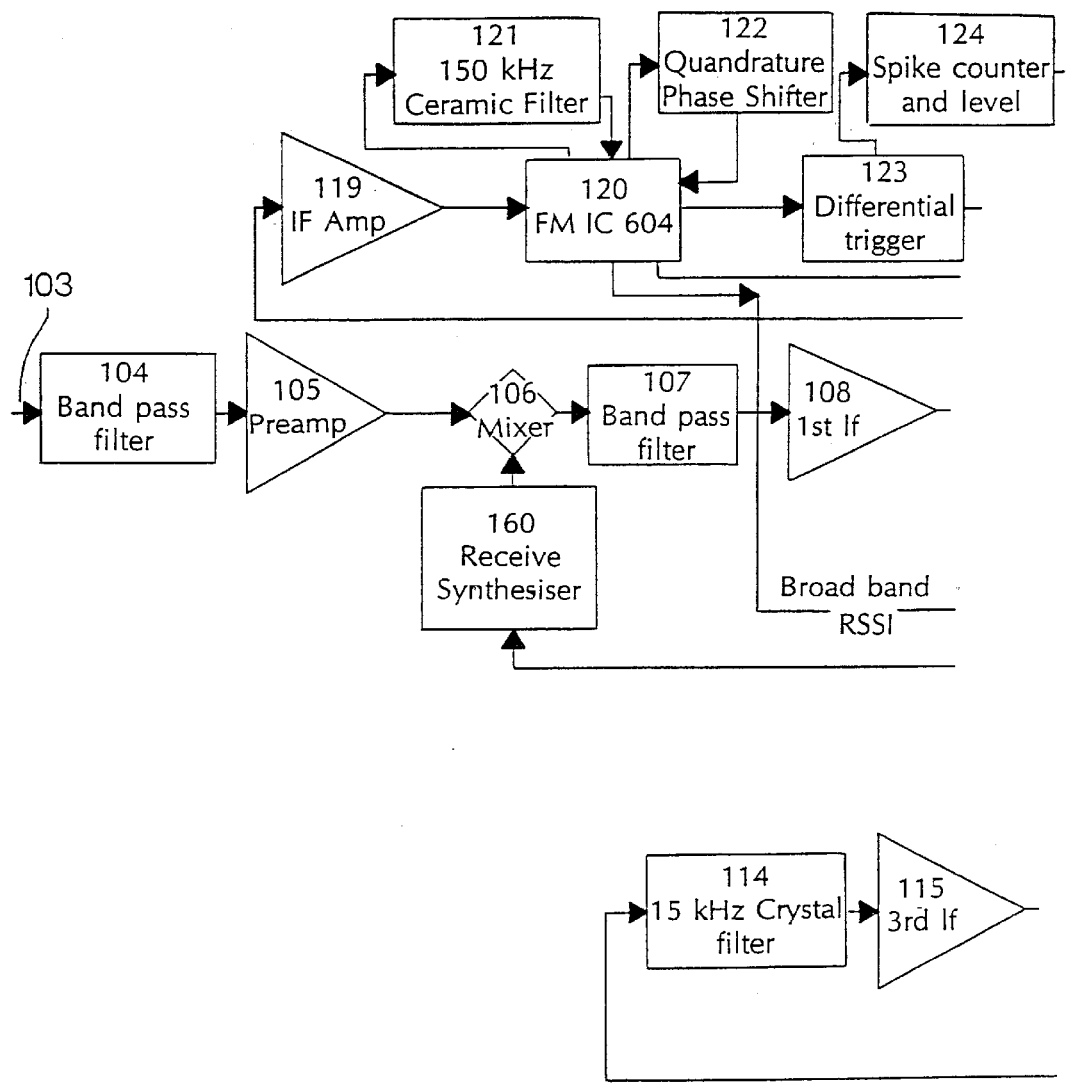
Figure 4B:
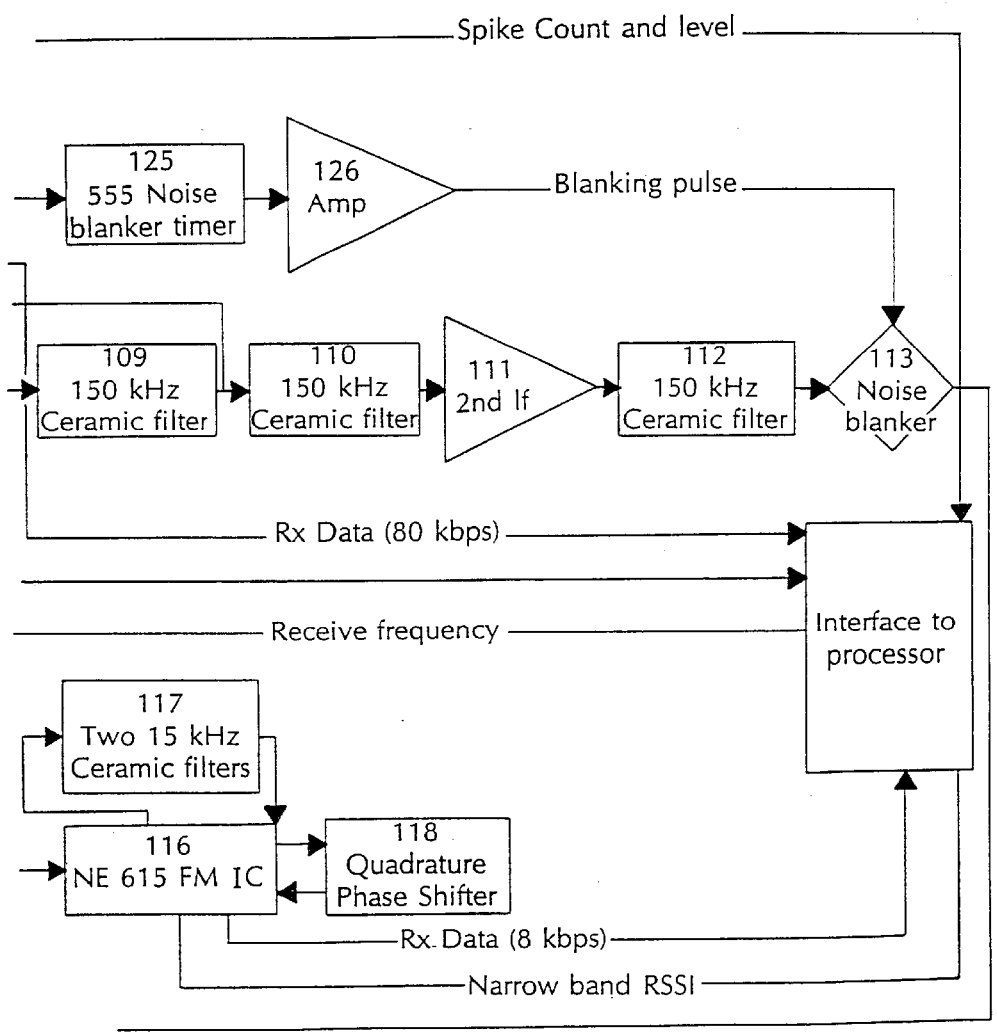
Figure 5A:
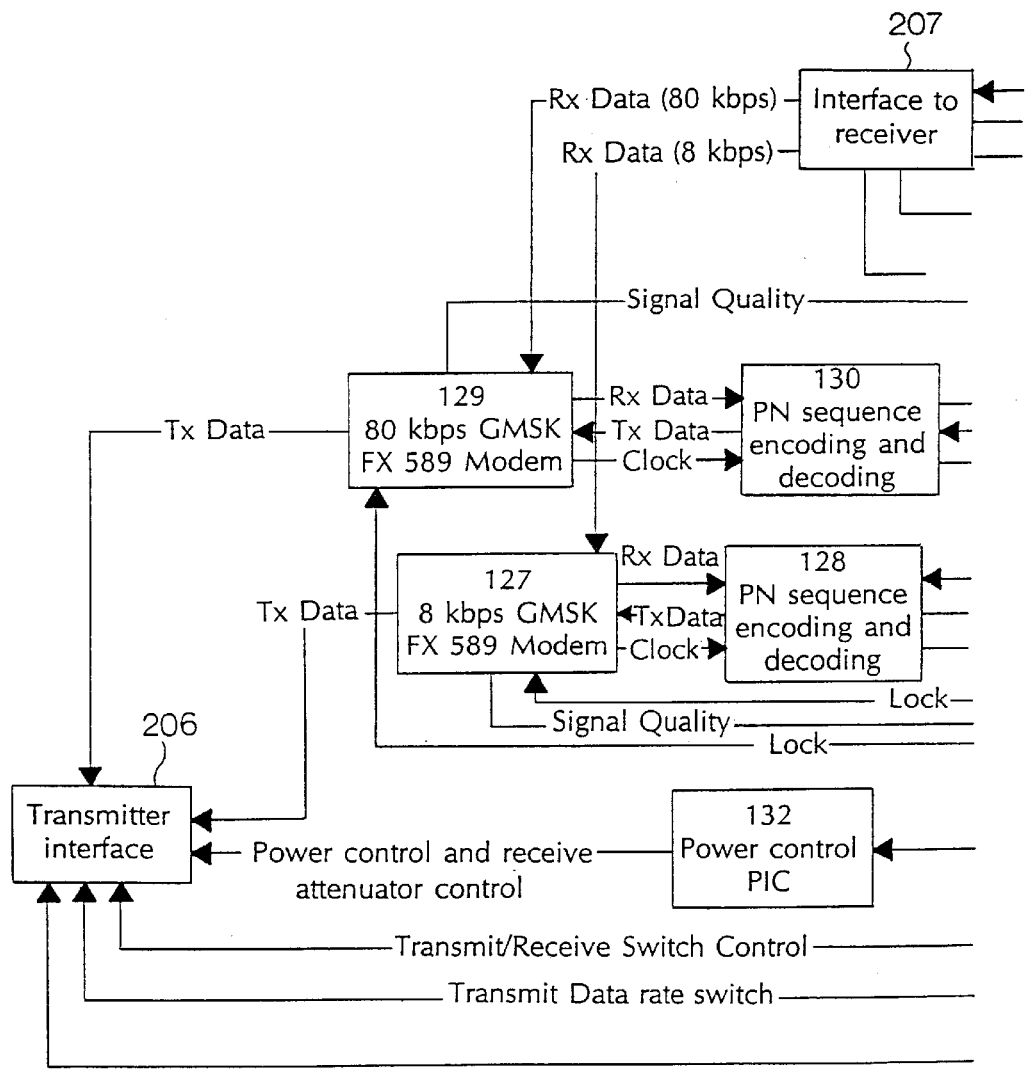
Figure 5B:
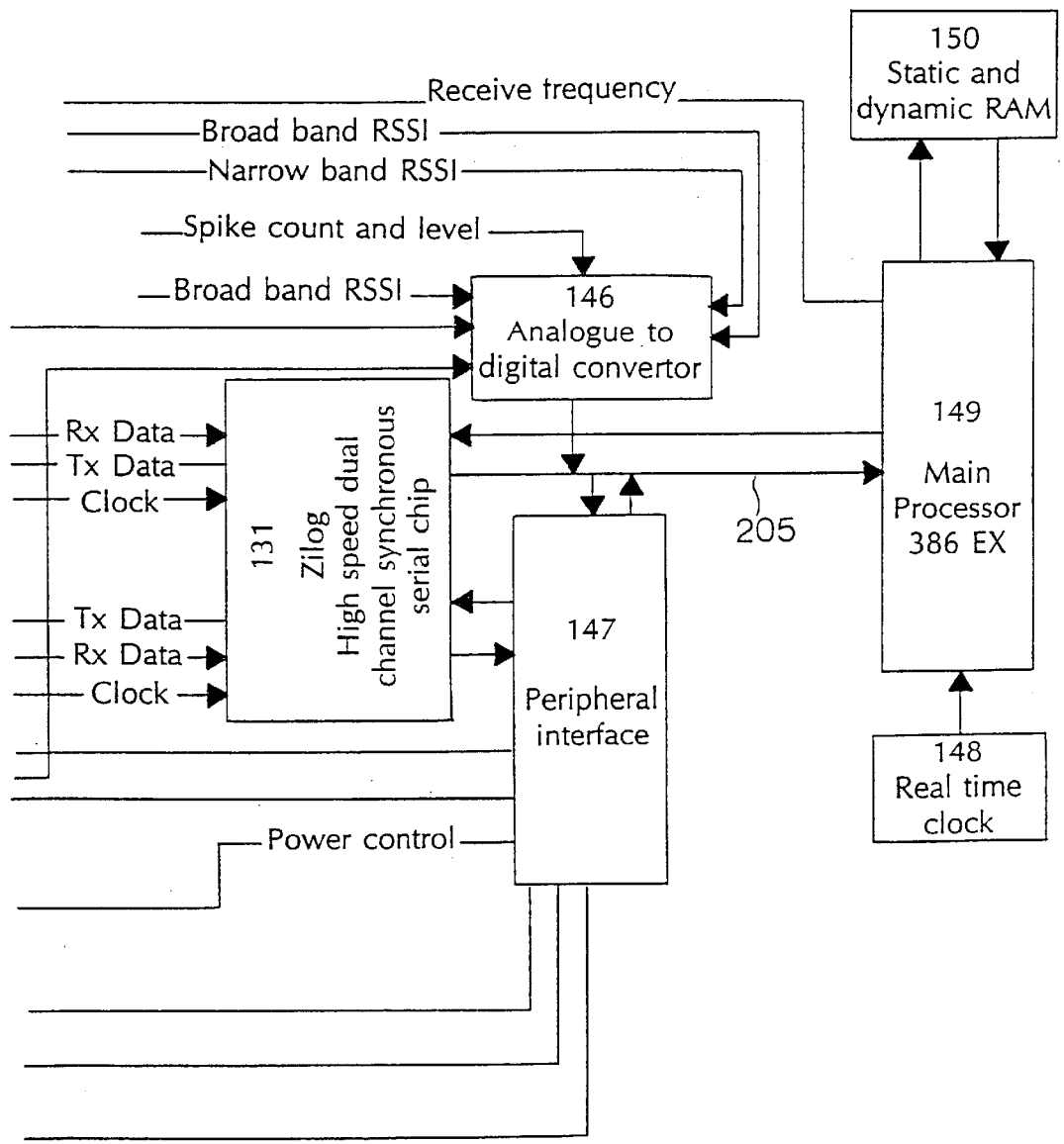

The network illustrated schematically in FIG. 1 comprises a plurality of stations, each comprising a transceiver able to receive and transmit data from any other station within range. A communication network of this kind is described in international patent application no. WO 96/19887, the contents of which are incorporated herein by reference. The stations of the network maintain contact with one another using the probing methodology described in international patent application no. PCT/GB98/01651, the contents of which are also incorporated herein by reference.

Although the method and apparatus of the present invention were designed for use in the above referenced communication network, it should be understood that the application of the present invention is not limited to such a network and can be employed in other networks, including conventional cellular or star networks, or even in a two-way communication situation between first and second stations.

In FIG. 1, an originating station A is able to communicate with five "nearby" stations B to F, and is transmitting data to a destination station O via intermediate stations B, I and M.

When any of the stations transmit data to any other station, it is necessary that the transmit power used be sufficient to enable successful reception of the transmitted data at the receiving station. At the same time, to avoid unnecessary energy consumption and interference with other stations in the network, or other communications systems in general, it is desirable to minimise the transmission power utilised.

The problem of setting an optimum transmission power is complicated by variations in the path quality between stations, which may be severe in the case of stations which are moving relative to one another.

In this specification, the expression "path quality" includes path loss (also referred to by those skilled in the art as transmission loss or path attenuation) which is a measure of the power lost in transmitting a signal from one point to another through a particular medium. However, the expression also includes other parameters of the transmission path between any two stations, such as phase distortion, time delay spread, Doppler shift and multipath fading characteristics, which would affect the transmission power required for successful transmission between any two stations.

The present invention addresses this problem by providing a method and apparatus for continually monitoring the path quality between stations and adjusting the transmission power used when transmitting data, so as to use just enough power to ensure successful reception of the transmitted data, without transmitting at a higher power than is required. In addition, other transmission parameters, such as the equalisation and coding applied to the transmitted signals, can be adjusted to improve the likelihood of successful reception.

When a station receives a data package from a remote station it measures the power or strength of the received transmission. This is known as the Received Signal Strength Indicator (RSSI) value of the received transmission. In the data packet from the remote station there is included data corresponding to the transmission power used by the remote station. The local station can therefore calculate the path loss (ie. transmission loss or path attenuation) between the two stations by subtracting the locally measured RSSI value from the transmission power value in any data packet. Whenever a local station responds to a probe signal from a remote station, it will always indicate the path loss it has calculated in the response data packet. Likewise, the local station knows that any data packets addressed to itself will contain data corresponding to the path loss measured by the remote station from the most recent probe signal received by that remote station from the local station.

The local station will compare its calculated path loss with the path loss data received from the remote station, and will use the difference in the path loss values to determine a correction factor to use when transmitting data to the remote station, thereby to adapt its output power to an optimum level, or as close to it as possible.

The first time the local station hears from the remote station it will use a correction factor of:

$Path_{Cor}$=Remote Path Loss−Local Path Loss

Thereafter:

$Path_{Cor}$=$Path_{Cor}$+(((Remote Path Loss−Local Path Loss)+$Path_{Cor}$)/2)−$Path_{Cor}$)

where the maximum adjustment made to $Path_{Cor}$ in both cases is 5 dB up or down.

$Path_{Cor}$ may only be a maximum of ±30 dB.

The local station adds the correction factor $Path_{Cor}$ to its measured path loss, thus generating a Corrected Path Loss value when determining what power to use when responding to the remote station. However, the Path Loss value it places in the packet header is its measured Path Loss without correction.

If the local station does not get a direct response from the remote station after ten transmissions then it must increase its $Path_{Cor}$ value by 5 dB to a maximum of +10 dB. The reason for doing this is to avoid going below the noise threshold of the remote station. (The $Path_{Cor}$ value is added to the measured Path Loss. The adjusted Path Loss is then used to determine the required transmission power. A smaller value for $Path_{Cor}$ will correspond to a lower transmission power. Therefore, if the $Path_{Cor}$ value is made too small or even negative then the transmission power may be too low to reach the remote station. It is therefore necessary to increase the $Path_{Cor}$ value in 5 dB steps until a response from the remote station is detected).

The local station will also not increase its transmission power more than 10 dB above normal. This is to avoid swamping other stations if there is an error with the remote station's receiver. However, if the local station does receive a response then the maximum adjustment may go as high as 30 dB above normal.

If the RSSI of the remote station is pegged it will set its Path Loss value in the data packet header as 0 (zero). A station will not make any adjustment to its path quality correction factor if either the remote Path Loss in the header is at zero, or if its local RSSI is pegged.

Having calculated the Path Loss and the correction factor $Path_{Cor}$, the local station can now determine the power required to transmit back to the remote station. The remote station also includes in every packet it sends the background RSSI values for the current, previous, and next modem. The local station will use the Corrected Path Loss and the remote background RSSI value to determine what power to use when responding.

Each station has a minimum Signal to Noise (S/N) ratio level that it will try to maintain for each modem. It is assumed that the required Signal to Noise ratio of all the stations in the network is the same. The local station will set the power level for its transmissions such that the remote station will receive them at the correct S/N ratio. If the local station has additional data to send, or if it can operate at a higher data rate, then the required S/N ratio required may vary.

EXAMPLE 1

| | |
|---|---|
| Remote station Tx Power | 40 dBm |
| Remote Station Background RSSI | −120 dBm |
| Remote Station Path Loss | 140 dB |
| Local station Required S/N | 25 dB |
| Local station Path Loss | 130 dB |
| $Path_{Cor}$ | = Remote Path Loss − Local Path Loss (Assume first time) |
| | = 140 − 130 |
| | = 10 dB |
| Corrected Path Loss | = Local Path Loss + $Path_{Cor}$ |
| | = 130 + 10 |
| | = 140 dB |
| Local Tx Power | = Remote RSSI + Required S/N + Corrected Path Loss |
| | = −120 + 25 + 140 |
| | = 45 dBm |

From the above example it can be seen that the local station must use a Tx Power of 45 dBm to obtain a remote S/N ratio of 25 dB. If the local station can only set its power in 10 dB steps then it must adjust its power up to the next step, ie. 50 dBm.

Figure 7A:
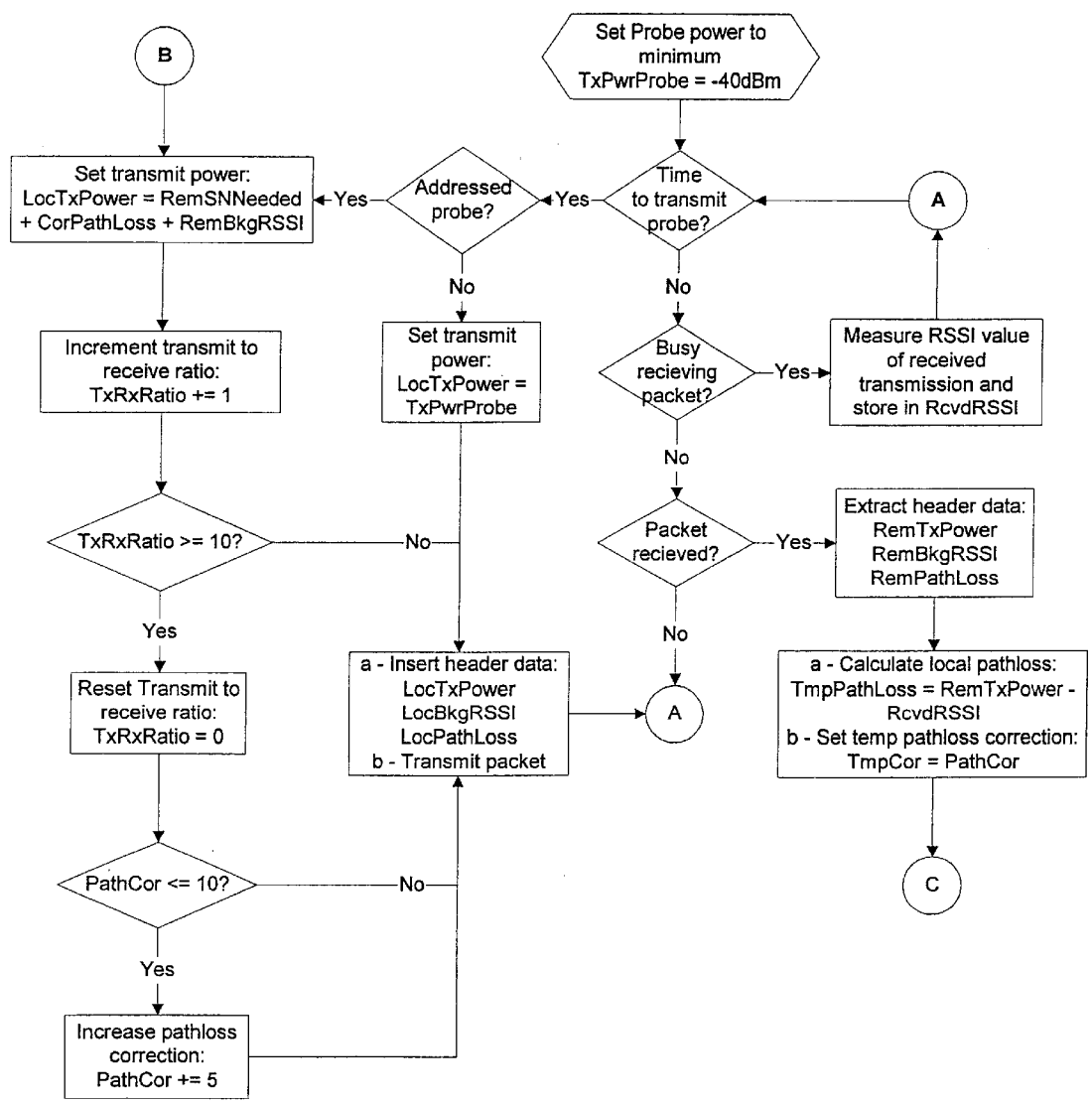
FIGS. 7 to 9 are flow diagrams showing the power, modem data rate and packet size adaption processes of the invention, respectively.
Figure 7B:
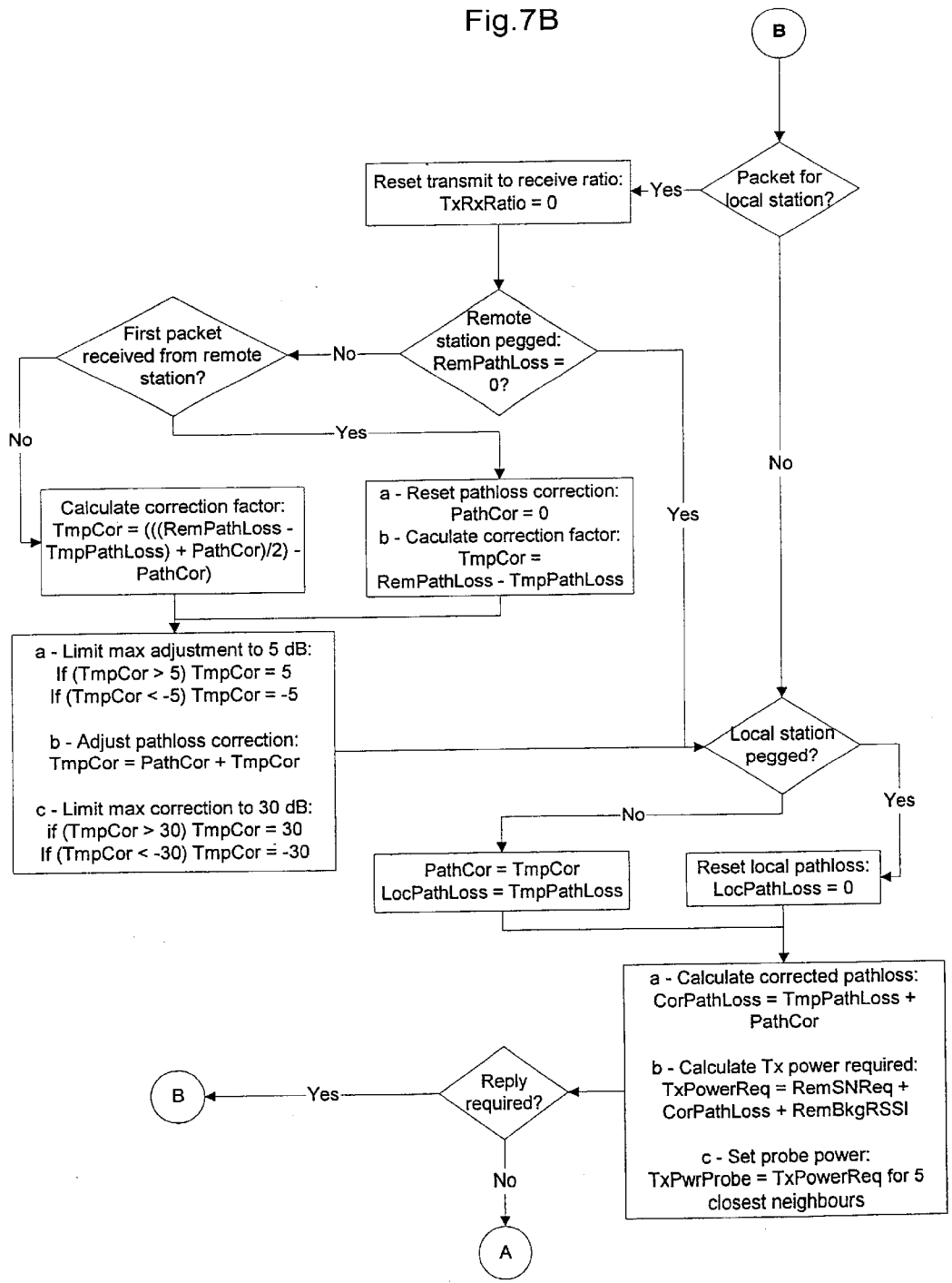

The power adaption process described above is summarised graphically in the flow chart of FIG. 7.

A station may have one or more modems. Each modem operates at a different data rate. However, they all operate in the same channel, ie. frequency and/or medium. Therefore when a station changes channels all the modems will be available on the new channel. A channel may however have a minimum and/or maximum data rate associated with it. For example if a station is on a 80 kbps probing channel it may not use data rates lower than 80 kbps. Therefore it may not use the 8 kbps modem on that channel. In the same way the 8 kbps probing channel may have a maximum bandwidth of 80 kbps, therefore not allowing the use of the 800 kbps modem on that channel.

When a station is probing on a probing channel, it will use the data rate associated with the channel. It will always probe on the channel and at the power required to maintain 5 neighbours.

When a local station responds to the probe of a remote station, or if it responds to a data packet of a remote station, it will always try to use the optimum modem for its response.

A station will always try to respond at the highest data rate possible. The highest data rate will be determined by the maximum data rate allowed for the channel and by, the remote SIN ratio on the modem associated with that data rate.

If a station can use a higher data rate on the channel, it will determine the remote SIN for that data rate. If it can achieve that required S/N ratio it will use the higher data rate. On the other hand, if the conditions are poor and the station can't achieve the required S/N ratio then it will remain at the current data rate. When condition are very poor and the station can't maintain the current data rate, it may even choose to respond at a lower data rate, if the channel allows. It will only use a lower data rate if the S/N ratio of the lower data rate is achieved. If the station cannot use a lower data rate, and if it is on the lowest data rate available then the station will try anyway. However, if there is a lower data rate available, but the station may not use it on the current channel, then the station will not respond to the remote station. This will force the remote station to find a lower data rate channel.

In Summary:

A station will switch to the next modem if the S/N ratio of the next modem meets the required SIN ratio and the maximum modem rate of the channel allows the next modem to be used.

A station will switch to the previous modem if the S/N ratio of the current modem is below the required S/N ratio and the S/N ratio of the previous modem meets the required S/N ratio and the minimum modem rate of the channel allows the previous modem to be used.

Figure 8A:
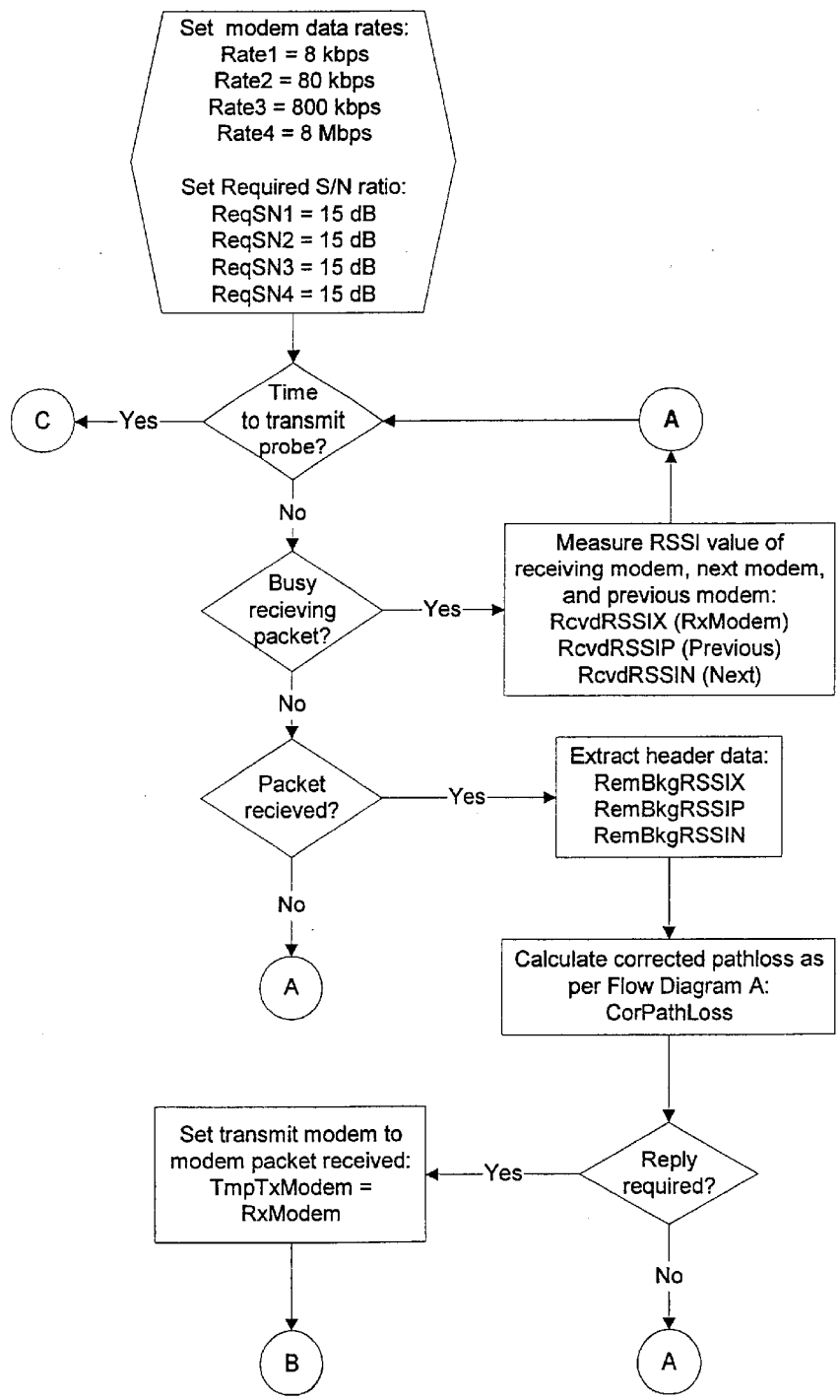
Figure 8B:
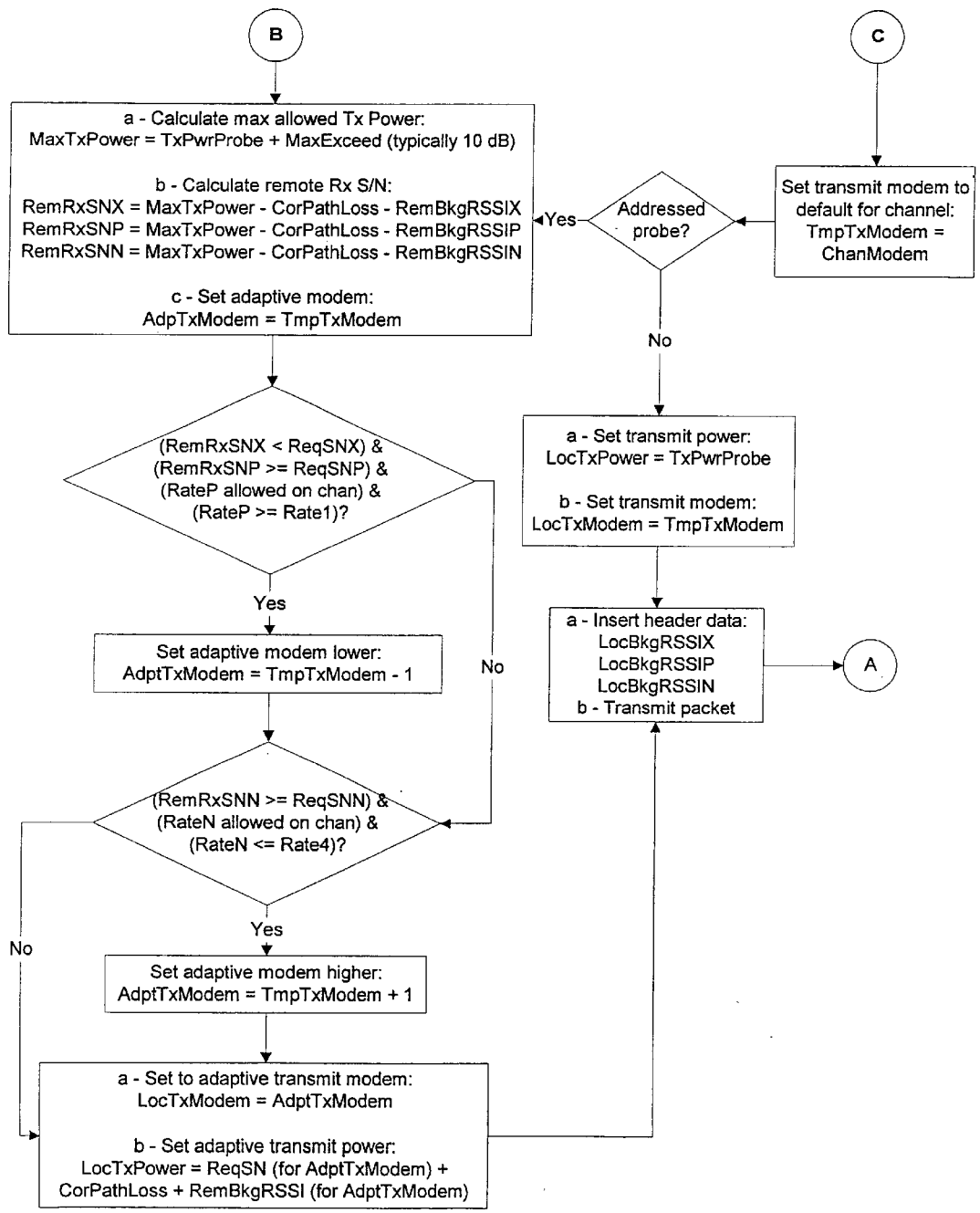

The modem data rate adaption process described above is summarised graphically in the flow chart of FIG. 8.

When a station responds to another station it will always try to send as much data as it can. The factors which limit the packet size are: spacing between probes, maximum transmission power, and the allowed transmission duration on a data channel.

In the prototype system, the base packet size is 127 bytes. This is the smallest packet size that will allow data to be reliably transmitted between two stations. (This assumes there is data to send. If a station has no data to send then the packet will always be smaller than 127 bytes.)

A station will use the base packet size under very bad conditions even when it has more data to send. Thus if it is sending to a remote station which has bad background noise, or is very far away, it will only be able to respond at the lowest data rate (8 kbps), and at maximum power.

If a station can achieve a remote S/N ratio better than the base value (i.e. Required S/N for 8 kbps), it may start using larger packets based on the following equations:

For a 10×baud rate increase it will multiply the packet size by a factor Z. (Typically Z=4)

Multiplier for packet size=$Z^{log(X)}$, where X is Baud 2/Baud 1.

For a 10 dB S/N increase, multiply packet size by Y (Typically Y=2)

Multiplier for packet size=$Y^{W/10}$, where W is additional S/N available.

The values for Z and Y are fixed for the entire network. Typical values for Z and Y are 4 and 2 respectively.

EXAMPLE 2

If a station can respond at 80 kbps at the required S/N ratio for 80 kbps, it will then use a maximum packet size of $127*4^{log(80000/8000)}=127*4=508$ bytes. If the station cannot fill the packet, it will still use the power required to achieve the required S/N ratio.

EXAMPLE 3

If a station can respond at 15 dB above the required S/N ratio for 80 kbps, it will then use a maximum packet size of $127*4^{log(80000/8000)}*2^{15/10}=127*4*2.83=1437$ bytes. If the station cannot fill the packet it will drop its transmission power to the level required for the packet size it will actually use. For example, even though it could use a packet size of 1437 bytes, if it only has 600 bytes to send to the other station it will adjust its Tx power to a level between the required S/N and 15 dB above the required S/N by using the inverse of the equation $Y^{W/10}$ to determine how much additional power it needs above the required S/N ratio.

It is important to note that even though a station may use a larger packet size based on the available S/N ratio and data rate, the packet size may be limited by the probe interval. For example, if the probe interval on the 8 kbps channel is 300 milliseconds, and the maximum packet size based on the available S/N ratio is 600 bytes (which translates to 600 milliseconds at 8 kbps), it can be seen that a packet size of less than 300 bytes must be used, otherwise other stations may corrupt the packet when they probe.

A number of factors must be taken into account when trying to determine the maximum packet size based on the probing rate. These factors include: Tx on delay (the time for the transmitter power amplifier to settle, and for the remote receiver to settle), modem training delay (length of modem training sequence), turnaround delay (time for processor to switch from Rx to Tx, ie. to process data), and propagation delay (time for signal to travel through medium).

To determine the maximum packet size based on the probing rate the following equation is used:

Max Length (ms)=Probe interval−Tx on delay−modem training delay−turnaround delay−propagation delay The length in bytes can then be determined by:

Max Length (bytes)=Data Rate/8*Max Length (seconds)

EXAMPLE 4

Probe interval is 300 milliseconds on 8 kbps channel. Tx on delay 2 milliseconds, modem training, delay is 2 milliseconds, turnaround delay 3 milliseconds, propagation delay 8 milliseconds (worse case for station 1200 km away).

Figure 9A:
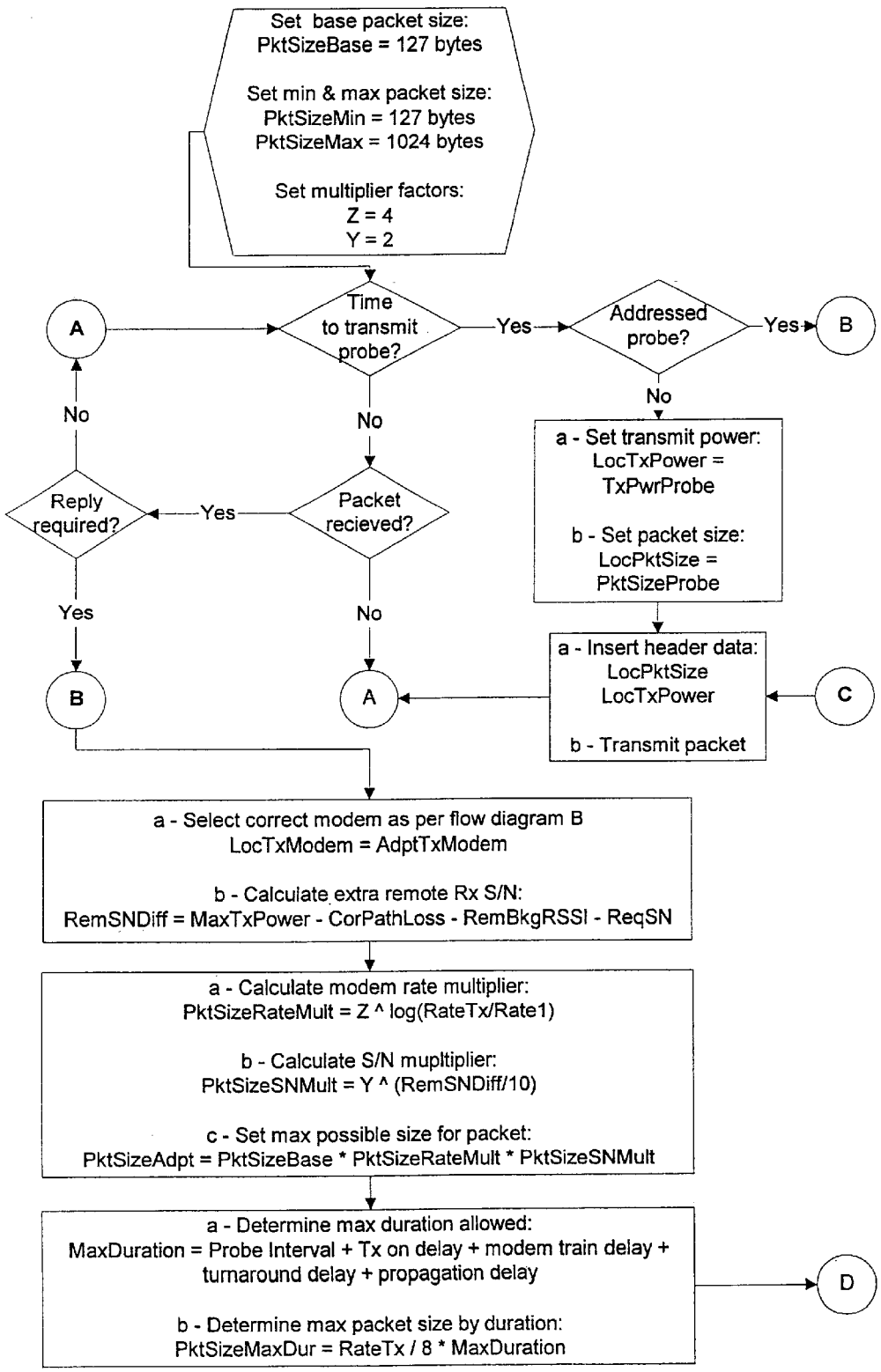
Figure 9B:
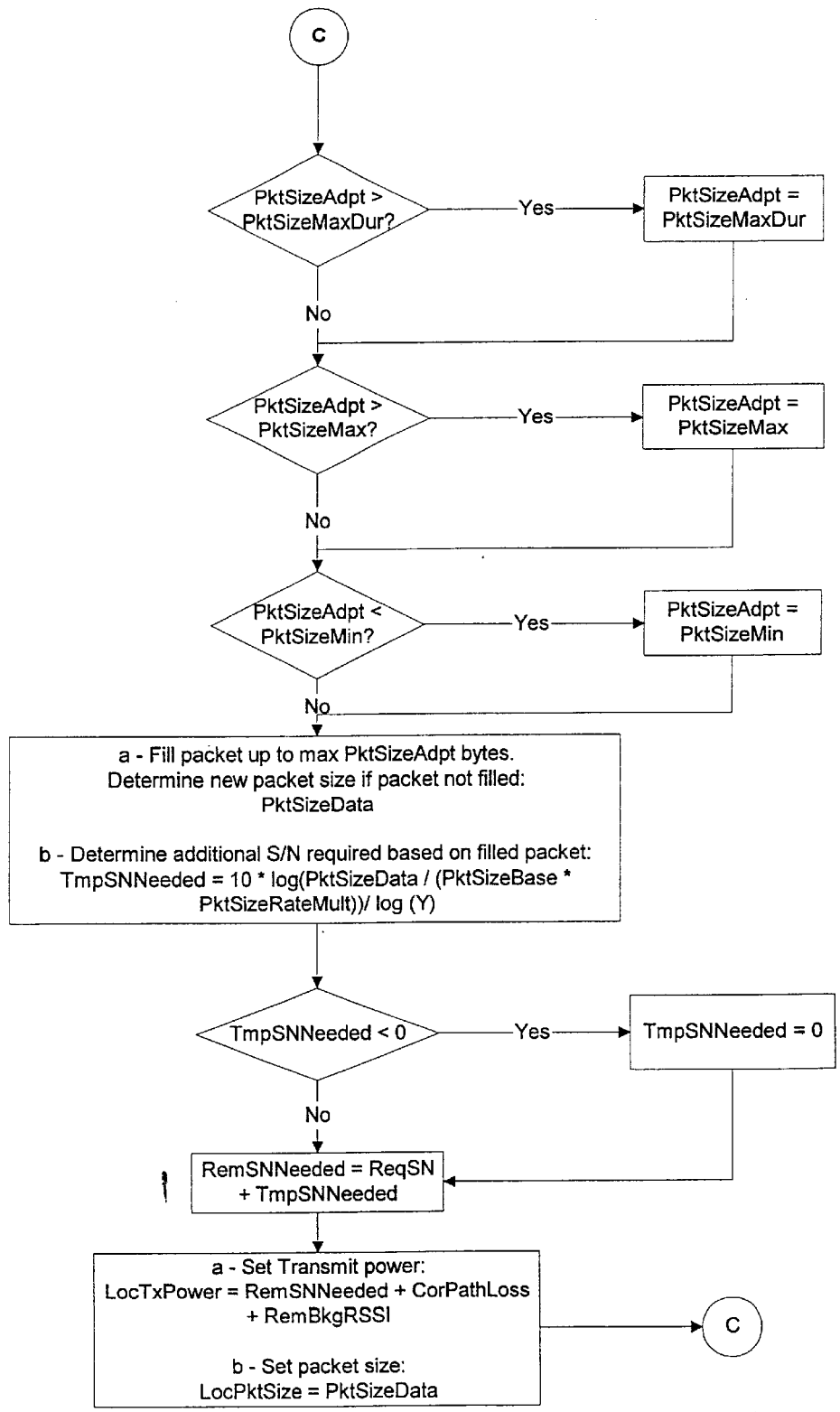

Max Length (ms) = Probe interval − Tx on delay − modem training delay − turnaround delay − propagation delay
= 300 − 2 − 2 − 3 − 8
= 285 ms Max Length (bytes) = Data Rate/8 * Max Length (seconds)
= 8000/8 * 0.285
= 285 bytes The packet size adaption process described above is summarised graphically in the flow chart of FIG. 9.

Below is a table giving details of the format of Probe and Data packets used in the network of the invention.

Format of Probe and Data packets

| Variable | Bit Len | Allows |
| --- | --- | --- |
| Preamble | 64 | Modem training sequence (101010101010 etc . . . ) |
| Sync1 | 8 | First Sync Character used to lock Zilog |
| Sync2 | 8 | Second Sync Character used to lock Zilog |
| Sync3 | 8 | Third Sync character checked by software |
| Packet Size | 16 | Size of packet from Sync3 until last CRC |
| Size Check | 8 | Packet Size Check = Packet Size MSB XOR LSB |
| Protocol Version | 8 | Protocol Version |
| Packet Type | 8 | Packet Type (E.g. Probe, Data, Key, etc.) |
| Sending ID | 32 | Sending Station ID |
| Receiving ID | 32 | Receiving Station ID (0 = Broadcast) |
| Packet Number | 16 | Packet number |
| Adp Tx Power | 8 | Sending station current power in dBm |
| Adp Tx Path Loss | 8 | Path Loss measured at sending station in dB |
| Adp Tx Activity | 4 | Sending station current Activity Level |
| Adp Tx Antenna | 8 | Sending station current antenna configuration |
| Adp Tx Bkg RSSI − 1 | 8 | Sending station RSSI in dBm −> Current Modem − 1 |
| Adp Tx Bkg RSSI | 8 | Sending station RSSI in dBm −> Current Modem |
| Adp Tx Bkg RSSI + 1 | 8 | Sending station RSSI in dBm −> Current Modem + 1 |
| Adp Tx Spike Noise | 8 | Spike Frequency & Level at sending station |
| Adp Rx Activity | 4 | Required Activity Level for receiving station |
| Adp Rx Channel | 8 | Required Rx & Tx Channel for receiving station |
| Header CRC | 16 | 16 bit CRC for header data |
| Neigh Routing Flags | 8 | Bit 0 − In Traffic, Bit 1 − Gateway, Bit 2 − Cert Auth |
| Neighbour Data Size | 16 | Size of routing data in bytes = 3 + 4 (Update) + IDs * 6 |
| Neigh Soft Update | 32 | Software Update Version (16) and Block Number (16) |
| Neighbour Data | x | Neigh * (32 (ID) + 8 (TxPowerReq) + 4 (ModemReq) + 4 (Flags)) |
| Packet Data | x | |
| CRC | 32 | 32 bit CRC for whole packet, including header |

Preamble:
This is a modem training sequence consisting of alternating 1's and 0's.

Sync1–Sync3:
These are the three Sync characters that are used to detect the start of a valid packet.

Packet Size:
This is the total size of the packet from Sync3 up to and including the last CRC byte. The maximum packet size that is allowed on a probing channel is determined by the probing rate, ie. a station may not send a packet that is longer (measured in time) than the spacing between probes on the probing channel. The maximum packet size that is allowed on a data channel is determined by the amount of time a station is allowed to remain on a data channel.

Size Check:

This is used to check the Packet Size variable to avoid any invalid long packet receptions.

Protocol Version:

This is used to check which protocol version is being used. If the software can not support the version the packet will be ignored.

Packet Type:

This defines the type of packet being sent. Another packet will directly follow the current packet, if the most significant bit is set.

Receiving ID:

This is the ID of the station to which the packet is addressed.

Sending ID:

This is the ID of the station currently sending the packet.

Packet Number:

Each packet that is transmitted is given a new sequential number. The number is not used in any way by the protocol. It is merely there to provide information to a systems engineer. Each time the station is reset, the packet number starts at a random number. This prevents confusion with older packets.

Adp Tx Power:

The sending station's current power is given as the absolute power in dBm, in the range −80 dBm to +70 dBm. (Field allows values from −128 dBm to +127 dBm).

Tx Path Loss:

This is the path quality as measured at the sending station. Path Loss=(Remote Tx Power−Local RSSI) of receiving station's previous transmission. A value of 0 is used to indicate that the sending station's RSSI was pegged. The Path Quality is used as a correction factor at the receiving station, for the next time the receiving station transmits to the sending station.

Adp Tx Activity:

This is the activity level of the sending station, measured as: Activity=Watts*Time/(Bandwidth*Success) averaged over time.

Adp Tx Antenna:

This indicates the current antenna configuration being used by the sending station. Each of the 255 possible configurations describes a complete antenna system, i.e. Tx and Rx antenna.

Adp Tx Bkg RSSI:

This is the current background RSSI at the sending station for the modem that it is currently transmitting on. It allows for values from −255 to −1 dBm. The value sent is the absolute value of the RSSI, and the receiving station must multiply the value with −1 to get the correct value in dBm. A value of 0 is used to indicate that the channel is not available or is greater than or equal to 0 dBm. A value of 0 dBm cannot be used for adaptation purposes.

Adp Tx Bkg RSSI−1:

Same as above except for the previous modem.

Adp Tx Bkg RSSI+1:

Same as above except for the next modem.

Tx Spike Noise:

The lower 3 bits for spike frequency in Hz, 0=none, 1, 5, 10, 50, 100, 500, & >500, and the next 5 bits for spike amplitude in dB.

Adp Rx Activity:

If a station has a high activity level and is interfering with other stations, they will use this field to force the active station to drop its activity level. If a number of stations request a drop in activity then the interfering station will respond and drop its activity. If no stations request that such a drop, the active station will slowly start to increase its activity level. Thus if a station is in a very remote area it will keep increasing it activity level trying to generate connectivity. If it is in a very busy area, other stations will keep its activity at a lower level.

In preferred embodiments of the invention, a station will always try to maintain five neighbours, so that other stations should not need to request that the station reduce its activity. However the feature has been provided for cases where stations cannot reduce their power, or increase their data rate any further, yet they still interfere with too many other stations.

Adp Rx Channel:

Allows 255 predefined channels. These channels are set for the entire network. Each channel will have a probing rate associated with it (it may be turned off, which makes it a data channel). Each channel will also have a minimum data rate associated with it. The channels will have the Tx and Tx Frequencies defined. The channels may also be defined as other media, e.g. Satellite, Diginet, ISDN, etc.

A sending station will request that another station move to a data channel (ie. where probing has been disabled) when it has more data to send to the receiving station than can fit in the packet size allowed for the probing channel.

Header CRC:

This is a 16-bit CRC check for the header data. It is the sum of all the bytes in the header. It is only checked if the packet CRC fails. This is provided as a means of determining which station sent the packet. If the packet CRC fails and the header CRC passes, the data provided in the header should be used with caution, since the Header CRC is not a very strong means of error detection.

The Neighbour routing fields given below are not included in the Header CRC since they may not be used unless the packet CRC is passed. This makes the routing less prone to errors.

Neigh Routing Flags:

These flags are used to enhance routing. They provide additional information about the current station. Currently defined bits are:

Bit 0—Set if current station is busy in traffic.

Bit 1—Set if current station is an Internet Gateway.

Bit 2—Set if current station is Certification Authority.

Bit 3—Reserved.

Another byte of 8 bits could be added should more flags be required.

Neighbour Data Size:

Size of routing data in bytes. This includes the Neigh Routing Flags and Neighbour Data Size (ie. 3 bytes). Another 4 bytes are added if the Neigh Soft Update field is included. An additional 6 bytes are added for each neighbour included in the Neighbour Data section. Neigh Soft Update must be included if any Neighbour Data is included.

Neigh Soft Update:

This is the current version of update software available at the current station (Upper 16 bits of field) and the current block number available (Lower 16 bits of field).

Neighbour Data:

This is the list of neighbours that the current station has routing data for. Every time the current station receives updated routing data for a station that is better than the data it had, it will update its own data and include the station in this list in its next probe. The data section has four sub fields for each station in the list:

Station ID: 32 bit field with the ID of the neighbour station.

Tx Power Req: 8 bit field indicating the combined or direct Tx power required to reach the Station ID from the current station.

Modem Req: Modem required by current station to reach destination station.

Flags: Flags giving additional routing information for destination station. Bit 0—In Traffic, Bit 1—Gateway, Bit 3—Cert Auth, Bit 4—Direct Neighbour. The last bit indicates that the station in the list is a direct neighbour of the current station.

Packet Data:

This is the data of the packet. It is made up of 1 or more segments. The segments may be of any type, and may have originated or be destined for any ID.

CRC:

This is a 32 bit CRC check for the entire packet. If this CRC fails the packet data is discarded, however the header data may still be salvaged if the header CRC passes.

Enhanced Method

The flow diagram of FIGS. 2A to 2D shows the process of measurement and power control and calibration carried out in the network of FIG. 1. The originating station A measures the signal strength it receives from station B. In addition, station A identifies station B from its transmission headers and identifies which station it is addressing and what information is being sent. Station A then reads the transmit power and noise/interference level embedded in station B's header, thereby deriving from it the power level that Station B is using to reach the station it is addressing as well as its local noise/interference floor. Station A can then compute the path quality from station B to station A by using its measured signal strength and the declared power level of station B.

If station B is responding to another station such as station C, station A can read from station B's header its declared path quality to station C, thereby deriving information as to fluctuating path qualities between stations B and C, by simply monitoring the transmission of station B. In addition, since station B declares its transmitted power in responding to station C in conjunction with the path loss declared by station B to station C, it is possible for station A to compute the noise/interference floor at station C even though it cannot hear the transmissions of station C.

By monitoring the transmissions of station B at station A when station B transmits to station C, the path quality, required power level and noise/interference floor of both stations B and C may be derived, even though station C is "out of range" of station A.

If station B is probing and is not responding to any other station, no other information as to path quality or required path quality can be derived from its transmissions apart from calculating the effective path quality from A to B. If station A monitors station B responding to station A and reads the calculated path quality to station A embedded in station B's header, station A can then compare this calculated path quality to that read from station B and calculates a differential. Station A uses the differential to update its average path quality differential. This is done by comparing the path quality it computes to that which station B computes, and that differential is as a result of differences in the methods of measurement and other inaccuracies of the two stations.

However, since there is a fluctuation in path quality between transmissions it is possible that the path quality changes from the time that station B calculated the path quality from station A to station B, to the time that station A calculated the path quality from station B to station A. Therefore, a rate of change can be calculated over and above the differential long-term averaging which is a result of measurement inaccuracy. This rate of change will be due to the rate of change of the actual path quality due to propagation changes between transmissions.

Station A may also use a noise/interference level declared by station B to update its database to indicate the slow rate of change of noise/interference, based upon past records at station B and also fast fluctuations that may be in the noise/interference floor of B. Station A may then use the predicted fluctuations in the path quality from station A to station B and the predicted fluctuations in the rate of change of noise/interference in order to predict an opportunity to transmit to station B. This is done so as to choose periods of minimum path quality or minimum noise floor between stations A and B. Since station A is gathering data from other stations, for example stations B, C, D, E and F, it can decide whether station B provides the best opportunity, or whether it should choose one of the other stations. In addition, it can choose its data rate, packet duration and transmitter power based upon the rate of change and duration of the fluctuations of path quality and noise/interference that exist between stations A and B.

If station A chooses station B to transmit data to, it receives an acknowledgement back from station B, and the information is then forwarded on from station B opportunistically to the other stations. It is important to note that by monitoring the transmissions from station B, station A also has an idea of the path quality from station B to stations G, H, I, J, K, etc., and other stations to which station B can transmit. By monitoring those transmissions, it picks up the fluctuations in path quality between station B and the other stations and an indication of the noise/interference floor fluctuations of the other stations even if those other stations are not directly monitored by station A. Using this technique an opportunistic relay station can be chosen, taking not just the first hop but two hops into account and, providing overall routing information is available, data can be routed effectively towards the destination station O.

Hardware

FIGS. 3, 4, 5 and 6 show the basic hardware used to implement the invention. These Figures correspond to FIGS. 8, 9, 10 and 11 of the abovementioned international patent application no. WO 96/19887.

Based upon its "decision" to transmit, the main processor 149 will decide on a power level data rate and packet duration to use and will send this packet to the serial controller 131 and simultaneously through the peripheral interface 147 switch the transmit/receive switch 103 into transmit mode and switch the transmitter on after a suitable delay. The Zilog chip 131 will send the packet data together with a suitable header and CRC check via the PN sequence encoders in block 128 or 130, depending on the data rate chosen.

The main processor 149 will embed in the data packet, as one of the fields of information, data corresponding to the transmit power it is using, which will be the same transmit power as sent to the power control PIC block 132, which in turn is used to drive the power control circuit 141, which in turn controls the gain control and low pass filter block 143. This block in turn uses feedback from the power amplifier 145 to control the drivers 144 and 142.

The sensing and gain feedback method allows a reasonably accurate power level to be derived based upon the instruction from the power control circuit 141.

Prior to switching the power amplifier on, the transmission frequency is selected by the synthesizer 138, after which the power amplifier 145 is instructed via the driver block 141 and the amplifier is switched on.

If power levels below the minimum power level provided by the power amplifier 145 are required, the switched attenuator block 102 may be switched in, in order to provide up to an additional 40 dB of attenuation. Therefore the processor can instruct the power amplifier to switch in an attenuator combination to provide an output power level ranging from minus 40 dBm to plus 50 dBm. When the amplifier is switched on, the processor obtains information from the low power sensing circuit 101 as to the forward and reverse power, which is sent via the analogue to digital converter 146 and is used by the main processor 149 in order to monitor the level of power being transmitted. This information is then stored in the dynamic RAM 150 to provide information as to forward and reflected power levels actually generated by comparison to the level requested.

The amount of output transmit power will be affected by the efficiency of the transmit power control loop (blocks 145, 144, 142 and 143) and the switched attenuator block 102. In addition, any mismatch in the antenna 100 will also result in variations in reflected and forward power. The relative power actually output for various levels required can be stored by the processor in the RAM providing a table giving requested against actual power output levels. This can be used to allow the processor to use a more accurate power level field in the information it provides on future transmissions, within messages or probe signals. Since the power level is varied from between minus 40 dBm to plus 50 dBm there are effectively ten different power levels spaced 10 dB apart that may be transmitted. Therefore, the table stored by the processor will have these ten power levels, with the requested power level and actual power level being in this range.

Any other station in the network will then receive this transmission via its antenna 100. The received signal will then pass through the low power sensing circuit 101 and the switched attenuator 102, which initially is set for 0 dB attenuation. It will then pass through the 2 MHz bandpass filter 104, which will remove out of band interference, and then passes into the preamplifier 105, which amplifies the signal before it is mixed down via the mixer 106 to a 10.7 MHz IF signal. This signal is filtered by the bandpass filler 107, and amplified in the IF amplifier 108 and further filtered and amplified in blocks 109, 110. 111 and 112.

The final filtering occurs at blocks 114 and 115, at which stage the signal is measured at block 116 using the narrowband RSSI function, the output of which is used via the main processor to determine the signal strength of the incoming transmission. This then allows the processor, if necessary, to request the power control PIC circuit 132 to switch in additional receiver attenuation up to 40 dB. The switching in of additional attenuation in will only be necessary if the signal exceeds the measurement range of the NE615 of block 116. Otherwise, the attenuator is left at 0 dB attenuation, allowing the full sensitivity of the receiver to be available for receiving small signals. The incoming transmission is measured in two bandwidths simultaneously, namely 8 kHz and 80 kHz. The 80 kHz bandwidth is measured by tapping off the 10.7 MHz IF signal after the 150 kHz ceramic filter 109 and using a 150 kHz ceramic filter 121 and an NE604 IC 120. This, too, has an RSSI output which is received via the interface by the main processor 149.

The broadband and narrowband RSSI are measured via the analogue to digital converter 146, which then passes the data on to the main processor 149. The main processor has a lookup table, and takes the information from the A to D converter and derives from previously calibrated data a receive signal strength. This data is calibrated in dBm, typically from minus 140 dBm to 0 dBm. This information is typically generated using the output of a calibrated signal generator, injecting this into the input of the receiver, and then dialling up various signal strength levels and instructing the processor via the keyboard 209 as to what power levels are being injected. This information is then stored permanently in static RAM or flash RAM 150.

Therefore, the receiving station can accurately record the power level of any incoming transmission. It then reads the address of the incoming transmission and its embedded transmit power level. By comparing these, for example, a plus 40 dBm transmit power level may be measured in the receiver as minus 90 dBm and this is then used to compute a path loss of 130 dB. Path losses may vary from 0 dB up to a maximum of 190 dB (+50−(−140)=190). The minimum path loss that can be measured is dependent on the transmission power of the transmitting station and the maximum signal that can be measured by the receiving station. Since with this design the maximum receiving signal is 0 dBm at the antenna port 100, a 0 dB path loss can be measured, providing the transmit power is less than 0 dBm. Otherwise, for example, at a transmit power of 50 dBm the minimum path loss that can be measured is 50 dB. This could be improved by adding additional steps in the switched attenuator or through using a different arrangement in the receiver. If the switched attenuator is fully switched in and the output of the A to D converter indicates that the RSSI is at its highest level, the receiving processor will tag the data associated with the transmission as being "pegged". This means that the path loss is less than is measurable.

The processor on receive will continually measure the background signal and interference, and providing that no transmissions are detected on either modem at either data rate, will monitor and measure the noise and interference in dBm and generate an average which will be stored in the static RAM. When a transmission is detected, the most recent noise measurement is compared to the signal strength to derive a signal to noise ratio. On each transmission, the background noise picked up prior to transmission is advertised inside the transmission message or probe as another field together with the transmitted power. Other stations in the network can pick up and derive from transmission not only the path quality but also the distant station's noise floor just prior to its transmission. The receiving station, since it knows the path quality and has the noise floor of the distant station, will then know at what power to transmit to achieve any desired signal to noise ratio at the distant station.

The required signal to noise ratio is typically based upon the performance of the modem and a figure based upon packet duration and probability of success. This required signal to noise ratio is stored in the database by the processor and is continually updated, based upon the success of transmissions to various destinations. If a station, for example, picks up a transmission and calculates the path loss to be 100 dB and the distant station to have a declared noise floor of minus 120 dBm, to meet the required signal to noise ratio of for example, 20 dB for 8 kilobits per second, it will then transmit at a power level of minus 20 dBm. This required signal to noise ratio will be different for 80 kilobits per second in that the noise floor would be higher in the wider bandwidth of 150 kHz by comparison to 15 kHz and in that the performance of the 80 kilobits per second modem may be different from that of the 8 kilobits per second modem.

Therefore, the receiving station would know that if, for example, the declared noise floor in the wideband is minus 110 dBm and the path loss is still 100 dB, but the required signal to noise ratio is, for example, 15 dB, it would require a transmission power of plus 5 dBm. The station receiving the transmission will know what power level to use to respond to the originating station.

Monitoring other communicating stations, the receiving station will see the path quality variation and the noise floor declared by various other stations it is monitoring varying as well, and through choosing a moment of minimum path quality and minimum noise floor will transmit at the appropriate power level to achieve the required signal to noise ratio to the station or stations that it is monitoring. In responding to a transmission, the responding station will switch on its transmitter, control the power amplifier via the power control PIC 132 to meet the required power level and then the main processor 149 will embed the fields of its own transmit power, its own receive noise prior to transmission and the path quality that it has just received from the station to which it is responding.

Depending on the signal to noise ratio and the power level required, the main processor will elect to switch in either the 80 kilobit per second or 8 kilobit per second modem and make the transmission. On making this transmission, it will embed its own transmit power level, its own background noise floor measured in both the 150 kHz and 15 kHz bandwidth and the path quality it has just calculated for the transmission to which it is responding. The originating station, on receiving the transmission, will again measure the RSSI in the two bandwidths and via the A to D converter 146, and using the lookup table in the static RAM 150, calculate the received signal strength. By examining the received packet passed from the Zilog synchronous serial chip 131, it will calculate the received path loss using the transmitter power declared and the measured RSSI and compare the path loss value sent to it by the other station.

In comparing these two path losses, since only a short period of time has elapsed between transmission and reception, these two path losses should be quite similar unless the path loss is fluctuating, caused perhaps by a moving vehicle environment. In successive transmissions, the difference between the two path loss values is averaged and stored since this number represents the difference due to measurement error in signal strength or error in the declared power level being transmitted. The averaging process is used to average out, say, the effects of moving vehicles and path loss fluctuation. The main processor will use this averaged number and retain one for every station in the network. It will have a path loss correction factor or delta ranging from a few dB to tens of dB for each station in the network which it will store in RAM. On detecting any station transmitting and measuring the path loss, the correction factor is then used to correct the transmit power level before responding to the station, ie. predictively. A typical process is as follows:

Station A measures the incoming path loss from Station B, of say 100 dB. Station A looks at Station B's address which is then compared to a lookup table to determine a correction factor or delta, for example 10 dB plus. This means that the path loss as measured by Station A is on average 10 dB higher than that measured by Station B. Based upon the path loss just measured by Station A and Station B's, noise, the power level required is calculated by Station A to meet the required signal to noise ratio at Station B. The difference allowed between the declared path loss by Station B and the measured path loss by Station A is stored by Station A. If a strong variation is detected, this is in all probability due to fluctuating path loss between transmissions, and therefore the receive signal strength is used to determine the path loss by Station A. The difference between the path loss values is used to update the average differential number, which over a number of transmissions will average any fluctuations in path loss between transmission and response.

Having the differential number is also useful, in that on hearing a station probing or communicating to any other station, a path loss can be calculated using the correction factor and an estimation can be made of the required transmit power to use to reach the distant station with sufficient signal to noise ratio. The path loss delta or correction factor is only updated when stations are interacting with each other and this field will only be present in a transmission when a station is responding to another, and will not be present when another station is simply probing, when this field is left empty.

Although embodiments of the invention have been described above with specific reference to the measurement of path loss in the sense of path attenuation or transmission loss, it will be understood that additional path quality parameters such as those referred to above can be measured to provide a more accurate path quality value for use in adjusting the transmission power used when transmitting data between stations.

What is claimed is:

1. A method of operating a communication network comprising a plurality of stations able to transmit data to and receive data from one another, the method comprising;

monitoring, at each station, the path quality between that station and each other station with which that station communicates;

recording, at each station, path quality data corresponding to the path quality associated with each said other station;

setting, at each station, a transmission power value based on the recorded path quality data associated with a selected other station when transmitting data to said selected other, station, thereby to increase the probability of transmitting data to said selected other station at an optimum power level; and transmitting path quality data corresponding to the path quality between a first and a second station when transmitting other data between the stations, so that path quality data recorded at the first station is communicated to the second station for use by the second station and vice versa, wherein each station monitors the transmissions of other stations to obtain path quality data therefrom, so that a first station monitoring a transmission from a second station within range of the first station to a third station out of range of the first station can obtain path quality data relating to the third station.

2. A method according to claim 1 wherein the monitoring of path quality between stations includes monitoring at least one of the path loss, phase distortion, time delay, Doppler shift and multipath fading characteristics of a channel between the stations.

3. A method according to claim 1 wherein each station monitors the transmission of other stations to obtain background noise/interference data therefrom, so that a first station monitoring a transmission from a second station within range of the first station to a third station out of range of the first station can obtain background noise/interference data relating to the third station.

4. A method according to claim 1 including selecting, opportunistically, a station for transmission of data thereto according to the path quality and/or background noise/interference data associated therewith.

5. A method according to claim 1 wherein the path quality at a station receiving a data transmission is calculated by comparing the measured power of the received transmission with data in the transmission indicating the transmission power thereof.

6. A method according to claim 5 wherein a station receiving such path quality data compares the received path quality data with respective stored path quality data and calculates a path quality correction value from a difference between the received and stored values, the path quality correction value being utilized to adjust the transmission power when transmitting data to the station which transmitted the path quality data.

7. A method according to claim 6 wherein the path quality correction factor is calculated by deriving rate of change data from a plurality of path quality correction factor calculations.

8. A method according to claim 7 wherein the rate of change data is utilized to adjust the transmission power predictively when transmitting data to a station whose path quality correction value is detected to be changing over time.

9. A method according to claim 5 including monitoring, from a first station transmitting data, the background nose/interference at a second station receiving a data transmission and adjusting the transmission power value at the station transmitting data to the receiving station, thereby to maintain the required signal to nose ration at the receiving station.

10. A method according to claim 9 including adjusting the data rate of message data transmitted from a first station to a second station according to the transmission power value set at the first station and the required signal to noise ratio at the second station.

11. A method according to claim 9 including adjusting the data rate of message data transmitted from a first station to a second station according to the transmission power value set at the first station and the required signal to noise ratio at the second station.

12. A method according to claim 9 including adjusting the length of message data packets transmitted from the first station to a second station according to the transmission power value set at the first station and the required signal to noise ratio at the second station.

13. Communication apparatus operable as a station in a network comprising a plurality of stations which can transmit data to and receive data from one another, the communication apparatus comprising:

transmitter means arranged to transmit data to selected stations;

receiver means arranged to receive data transmitted from other stations;

signal strength measuring means for measuring the power of received transmissions;

processor means for calculating and recording path quality data corresponding to the path quality associated with other stations; and control means for adjusting the output power of the transmitter according to the path quality between the apparatus and a destination station, wherein the processor means is arranged to include the path quality data in its transmissions to other stations for use by them, and to receive path quality data in transmissions from other stations for use in calculating updated path quality data, and further wherein to monitor path quality data in transmission from other stations, so that a first station monitoring a transmission from a second station within range of the first station to a third station out of the range of the first station can obtain path quality data relating to the third station.

14. Communication apparatus according to claim 13 wherein the processor means is adapted to select, opportunistically, another station for transmission of data thereto according to the path quality and/or background noise/interference data associated therewith.

15. Communication apparatus according to claim 13 wherein the processor means is arranged to monitor background noise/interference data in transmissions from other stations, so that a first station monitoring a transmission from a second station within range of the first station to a third station out of range of the first station can obtain background noise/interference data relating to the third station.

16. Communication apparatus according to claim 13 wherein the processor means is arranged to calculate the path quality by comparing data in received transmissions relating to their transmission power and/or a previously measured path quality with the measurements made by the signal strength measuring means.

17. Communication apparatus according to claim 16 wherein the processor means is arranged to monitor at least one of the path loss, phase distortion, time delay, Doppler shift and multipath fading characteristics of a channel between the apparatus and other stations.

18. Communication apparatus according to claim 16 wherein the processor means is arranged to extract path quality data from received transmissions, to compare the path quality data with the measured power of received transmissions, and to calculate a path quality correction factor from the difference therebetween, the path quality connection factor being utilized by the control means to adjust the output power of the transmitter.

19. Communication apparatus according to claim 18 wherein the processor means is adapted to derive rate of change data from a plurality of path quality correction factor calculations, thereby to compensate for variations in the path quality between stations.

20. Communication apparatus according to claim 19 wherein the processor means is arranged to utilize the rate of change data to adjust the transmission power predictively when transmitting data to a station whose path quality correction value is detected to be changing over time.

21. Communication apparatus according to claim 19 wherein the processor means is arranged to store path quality data for each of a plurality of stations and to set an initial transmission power valve when initiating communication with any one of said plurality of stations according to the respective stored path quality data.

* * * * *